US012572624B1

(12) United States Patent
Taguchi et al.

(10) Patent No.: US 12,572,624 B1
(45) Date of Patent: Mar. 10, 2026

(54) FAILURE PREDICTOR DETECTION DEVICE, FAILURE PREDICTOR DETECTION METHOD, TRAINING DEVICE, AND TRAINED LEARNING MODEL GENERATION METHOD

(71) Applicant: Mitsubishi Electric Corporation, Tokyo (JP)

(72) Inventors: Naoki Taguchi, Tokyo (JP); Hiroaki Hokari, Tokyo (JP); Yasushi Sato, Tokyo (JP); Genta Yoshimura, Tokyo (JP); Toshisada Mariyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 787 days.

(21) Appl. No.: 17/963,819

(22) Filed: Oct. 11, 2022

Related U.S. Application Data

(63) Continuation of application No. PCT/JP2020/022242, filed on Jun. 5, 2020.

(51) Int. Cl.
*G06N 20/00* (2019.01)
*G06F 18/21* (2023.01)
(Continued)

(52) U.S. Cl.
CPC ............ *G06F 18/22* (2023.01); *G06F 18/211* (2023.01); *G06F 18/217* (2023.01); *G06N 20/00* (2019.01)

(58) Field of Classification Search
CPC ....... G06N 20/00; G06F 18/22; G06F 18/211; G06F 18/217
See application file for complete search history.

(56) References Cited

U.S. PATENT DOCUMENTS

2012/0290879 A1* 11/2012 Shibuya ............... G05B 23/021
714/26
2018/0225166 A1* 8/2018 Maya ..................... G06N 5/045
(Continued)

FOREIGN PATENT DOCUMENTS

JP    2016-177676 A    10/2016
JP    2018-77634 A    5/2018
(Continued)

OTHER PUBLICATIONS

Extended European Search Report issued Apr. 26, 2023 in corresponding European Patent Application No. 20938992.3.
(Continued)

*Primary Examiner* — Dave Misir
(74) *Attorney, Agent, or Firm* — Birch, Stewart, Kolasch & Birch, LLP

(57) ABSTRACT

An object is to obtain a failure predictor detection device that is capable of more adequately detecting a failure predictor. A failure predictor detection device according to the present disclosure includes: an acquisition unit to acquire estimation data and comparison data of targeted equipment for failure predictor detection in a targeted time period for the failure predictor detection; an estimation unit to calculate an estimated value of the comparison data during a normal operation from the estimation data using a learning model; and a detection unit to detect a failure predictor of the equipment on the basis of comparison results at multiple times between the estimated values and measured values shown by the comparison data.

12 Claims, 18 Drawing Sheets

(51) Int. Cl.
    *G06F 18/211*     (2023.01)
    *G06F 18/22*     (2023.01)

(56)            References Cited

U.S. PATENT DOCUMENTS

| | | | |
|---|---|---|---|
| 2018/0231969 A1* | 8/2018 | Noda | G05B 23/0283 |
| 2019/0196430 A1* | 6/2019 | Seo | G06Q 10/0631 |
| 2020/0150159 A1* | 5/2020 | Takeda | G01R 19/2506 |
| 2020/0379454 A1* | 12/2020 | Trinh | G05B 23/024 |
| 2021/0333001 A1* | 10/2021 | Yamamoto | F24F 11/58 |

FOREIGN PATENT DOCUMENTS

| | | |
|---|---|---|
| JP | 2019-144931 A | 8/2019 |
| WO | WO 2018/230645 A1 | 12/2018 |

OTHER PUBLICATIONS

International Search Report (PCT/ISA/210) issued in PCT/JP2020/022242, dated Aug. 11, 2020.
The Written Opinion of the International Searching Authority (PCT/ISA/237) issued in PCT/JP2020/022242, dated Aug. 11, 2020.

* cited by examiner

1000

100 Failure predictor detection device

200 Training device

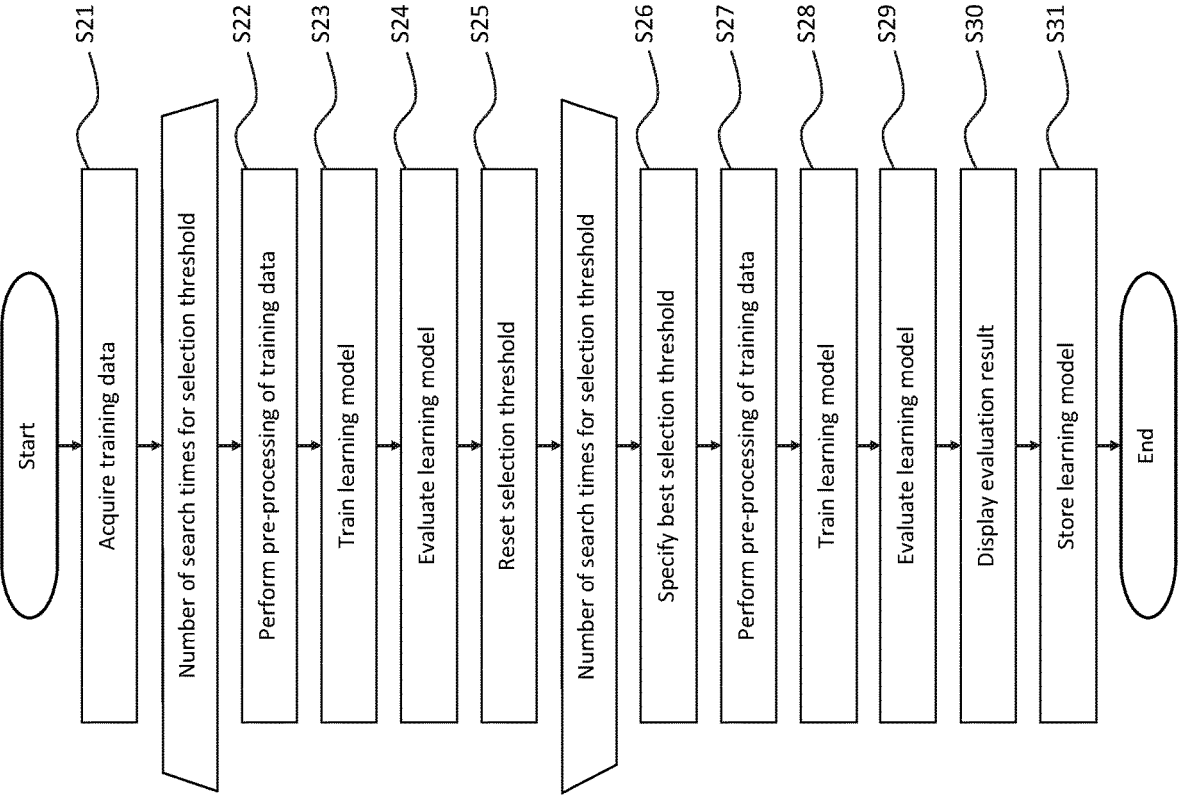

Start

Acquire training data — S21

Number of search times for selection threshold

Perform pre-processing of training data — S22

Train learning model — S23

Evaluate learning model — S24

Reset selection threshold — S25

Number of search times for selection threshold

Specify best selection threshold — S26

Perform pre-processing of training data — S27

Train learning model — S28

Evaluate learning model — S29

Display evaluation result — S30

Store learning model — S31

End

FAILURE PREDICTOR DETECTION DEVICE, FAILURE PREDICTOR DETECTION METHOD, TRAINING DEVICE, AND TRAINED LEARNING MODEL GENERATION METHOD

CROSS REFERENCE TO RELATED APPLICATIONS

This application is a Continuation of PCT International Application PCT/JP2020/022242, filed on Jun. 5, 2020, which is hereby expressly incorporated by reference into the present application.

TECHNICAL FIELD

The present disclosure relates to a failure predictor detection device, a failure predictor detection method, a failure predictor detection program, a training device, a trained learning model generation method, and a trained learning model generation program.

BACKGROUND TECHNOLOGY

A technique is proposed to detect a failure predictor of equipment using sensor data of equipment (for example, Patent Document 1). Normally, an amount of data indicating a failure predictor is small. Therefore, a learning model for a normal operation trained using only data in a normal condition is generated, and if a deviation between a predicted value given by the learning model and a measured value shown by acquired data is equal to or larger than a threshold value, a failure predictor is detected.

PRIOR ART REFERENCES

Patent Documents

[Patent Document 1] Japanese Patent Application Publication No. 2015-58673

SUMMARY OF INVENTION

Problem to be Solved by the Invention

However, with conventional technique, even if the equipment is not actually deteriorated, when the measured value deviates from the predicted value due to an environmental change around the equipment caused by external factors, a false detection of a failure predictor may result. The present disclosure is created to solve the above problem and to obtain a failure predictor detection device that is capable of detecting predictive signs of failure more appropriately.

Means for Solving the Problems

A failure predictor detection device according to the present disclosure includes: an acquisition unit to acquire estimation data and comparison data of targeted equipment for failure predictor detection in a targeted time period for the failure predictor detection; an estimation unit to calculate an estimated value of the comparison data during a normal operation from the estimation data using a learning model; a detection unit to detect a failure predictor of the equipment on the basis of comparison results at multiple times between the estimated values and measured values shown by the comparison data; and a pre-processing unit to select, from among the estimation data and the comparison data acquired by the acquisition unit, estimation data and comparison data in a time period during which a variance value is smaller than a predetermined selection threshold and to output the selected estimation data and comparison data to the estimation unit and the detection unit, wherein the estimation unit calculates the estimated value using the estimation data selected by the pre-processing unit and the detection unit detects the failure predictor of the equipment on the basis of the comparison results at multiple times between the measured values shown by the comparison data selected by the pre-processing unit and the estimated values.

Effects of the Invention

The failure predictor detection device according to the present disclosure includes a detection unit that detects a failure predictor of equipment on the basis of comparison results at multiple times between the estimated value and the measured value shown by comparison data, thereby reducing the possibility of the false detection due to mistaking an environmental change around the equipment as a sign of failure and more appropriately detecting the sign of failure.

BRIEF DESCRIPTION OF DRAWINGS

FIG. 2 is a diagram showing a configuration of an air conditioning system 2000 according to Embodiment 1.

FIG. 15 is a flowchart showing actions of the training device according to Embodiment 1.

MODES FOR CARRYING OUT THE
INVENTION

Embodiment 1

Figure 1:
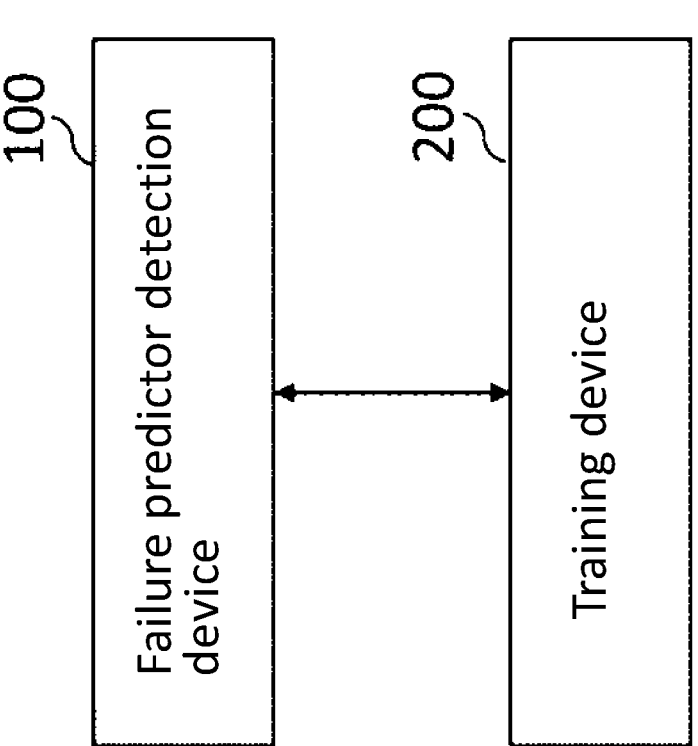
FIG. 1 is a diagram showing a configuration of a failure predictor detection system 1000 according to Embodiment 1.

FIG. 1 is a configuration diagram showing a configuration of a failure predictor detection system 1000 according to Embodiment 1. The failure predictor detection system 1000 includes a failure predictor detection device 100 and a training device 200. The failure predictor detection device 100 obtains a trained learning model from the training device 200 and the training device 200 acquires training data from the failure predictor detection device 100. The failure predictor detection device 100 will be described in detail in a section of inference phase below and the training device 200 will be described in detail in a section of training phase below. The inference phase is a phase where the failure predictor detection device 100 detects a failure predictor of equipment using the trained learning model, and the training phase is a phase where the training device 200 trains the learning model to be used by the failure predictor detection device 100 in the inference phase.

<Inference Phase>

Figure 2:
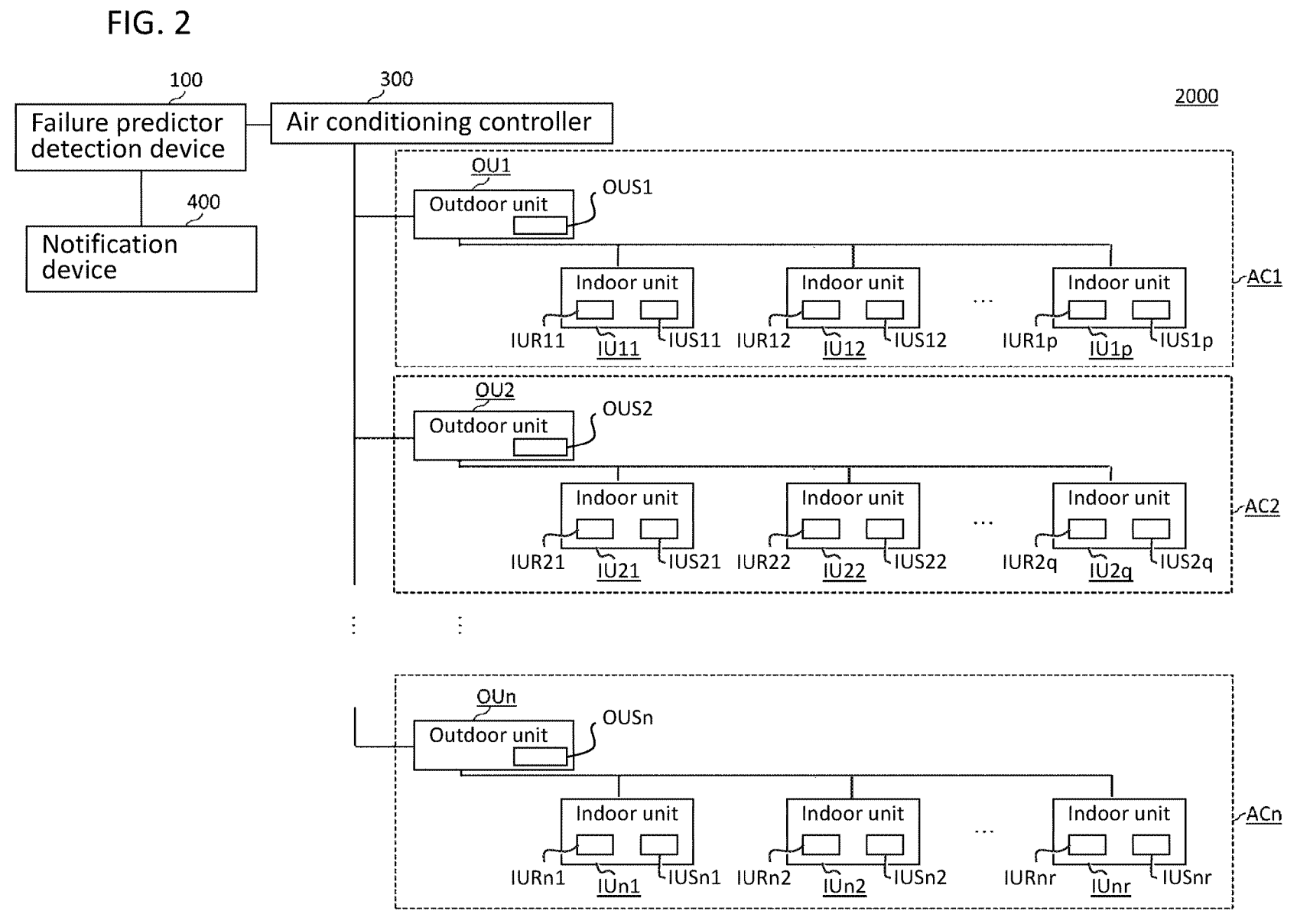

FIG. 2 is a diagram showing a configuration of an air conditioning system 2000 according to Embodiment 1. The air conditioning system 2000 includes: the failure predictor detection device 100, an air conditioning controller 300, a notification device 400, a plurality of outdoor units OU (OU1, OU2, . . . OUn); and a plurality of indoor units IU (IU11, IU12, . . . IU1*p*, IU21, IU22, . . . IU2*q*, IUn1, IUn2, . . . IUnr), where n, p, q, and r are arbitrary positive integers. In the following, when referring to a specific outdoor unit, an additional symbol will be added after OU, and when referring to any outdoor unit or all outdoor units, only OU will be used. Similarly for the indoor units, when referring to a specific indoor unit, an additional symbol will be added after IU, and when referring to any indoor unit or all indoor units, only IU will be used. The same denoting rule is used also for air conditioner AC, outdoor sensor OUS, indoor sensor IUS, and receiving unit IUR, which will be described later. In addition, a combination of an outdoor unit OU and indoor units IU are referred to as an air conditioner AC. In Embodiment 1, the equipment is air conditioners AC.

The failure predictor detection device 100 is a device that detects a failure predictor of the equipment, details of which will be described later.

The notification device 400 is a device to give a notification to the user of the failure predictor detection device 100 on the basis of a signal from the failure predictor detection device 100. Details will be described later, along with the failure predictor detection device 100.

The air conditioning controller 300 is a centralized controller of all outdoor units OU and all indoor units IU and consolidates information for all the outdoor units OU and all the indoor units IU. In addition, the air conditioning controller 300 includes a communication interface to receive information sent by the failure predictor detection device 100 and a processor and a memory to control the outdoor units OU and the indoor units IU on the basis of the received information.

Each outdoor unit OU is connected to the plurality of indoor units IU. For example, the indoor units IU1 (IU11, IU12, . . . IU1*p*) are connected to the outdoor unit OU1. The air conditioning controller 300 is connected to the indoor units IU and the outdoor units OU by an electromagnetic method, in which the connection may be wired or wireless. The air conditioning controller 300 may be installed in the same building in which the indoor units IU and the outdoor units OU are located or may be remotely located and connected to them via a network.

Each outdoor unit OU, together with the indoor units IU connected it, constitutes an air conditioner AC (AC1, AC2, . . . ACn) that provides air conditioning for a room. In addition, each outdoor unit OU includes an outdoor sensor OUS (OUS1, OUS2, . . . OUSn) that detects the state of the outdoor environment where the outdoor unit OU is installed and the state of the outdoor unit OU to acquire outdoor environment information and outdoor unit information. Each outdoor sensor OUS outputs the acquired outdoor environment information and outdoor unit information to the air conditioning controller 300. Here, the outdoor environment information is information that shows a state of the outdoor environment such as an outdoor temperature and an outdoor humidity at times.

Also, the outdoor unit information is information that shows a state of the outdoor unit such as a compressor frequency.

In addition, each indoor unit IU includes an indoor sensor IUS (IUS11, IUS12, . . . IUS1*p*, IUS21, IUS22, . . . IUS2*q*, IUSn1, IUSn2, . . . IUSnr) that detects the state of the indoor environment where the indoor unit IU is installed and the state of the indoor unit IU to acquire indoor environment information and indoor unit information. Also, each indoor unit IU includes a receiving unit IUR (IUR11, IUR12, . . . IUR1*p*, IUR21, IUR22, . . . IUR2*q*, IURn1, IURn2, . . . IURnr) that receives setting information from the user. Each indoor unit IU outputs the acquired indoor environment information and indoor unit information; the received setting information; and operation information showing operating conditions of the air conditioner AC to the air conditioning controller 300 via the outdoor unit OU. Here, the indoor environment information is information that shows a state of the indoor environment such as a room temperature and an indoor humidity at times. The setting information is information set by the user via the receiving unit such as a target time for an environmental value to reach a target value, a target temperature, and a target humidity in the room where the indoor unit IU is installed. Here, the environmental value of a room is a value shown by the indoor environment information, and the target value is a value shown by the setting information as a target of the environmental value of the room.

The operation information is information that shows the operating conditions of the air conditioner AC such as an operating capacity of the air conditioner AC, information showing whether the air conditioner AC is in or out of operation, and information showing which mode of operation, including cooling, heating, and dehumidification modes, the air conditioner AC is in. Not only the indoor unit IU but also the outdoor unit OU may be configured to output its operation information. Here, the operating capacity is information that shows the strength of the air conditioning performance of the air conditioner AC such as temperatures of refrigerant's evaporation and condensation in the outdoor unit OU and the number of the indoor units IU to operate.

In the above, the outdoor unit OU and the indoor unit IU include the outdoor sensor OUS and the indoor sensor IUS, respectively, but the various sensors may be provided independently of the outdoor unit OU and the indoor unit IU.

Figure 3:
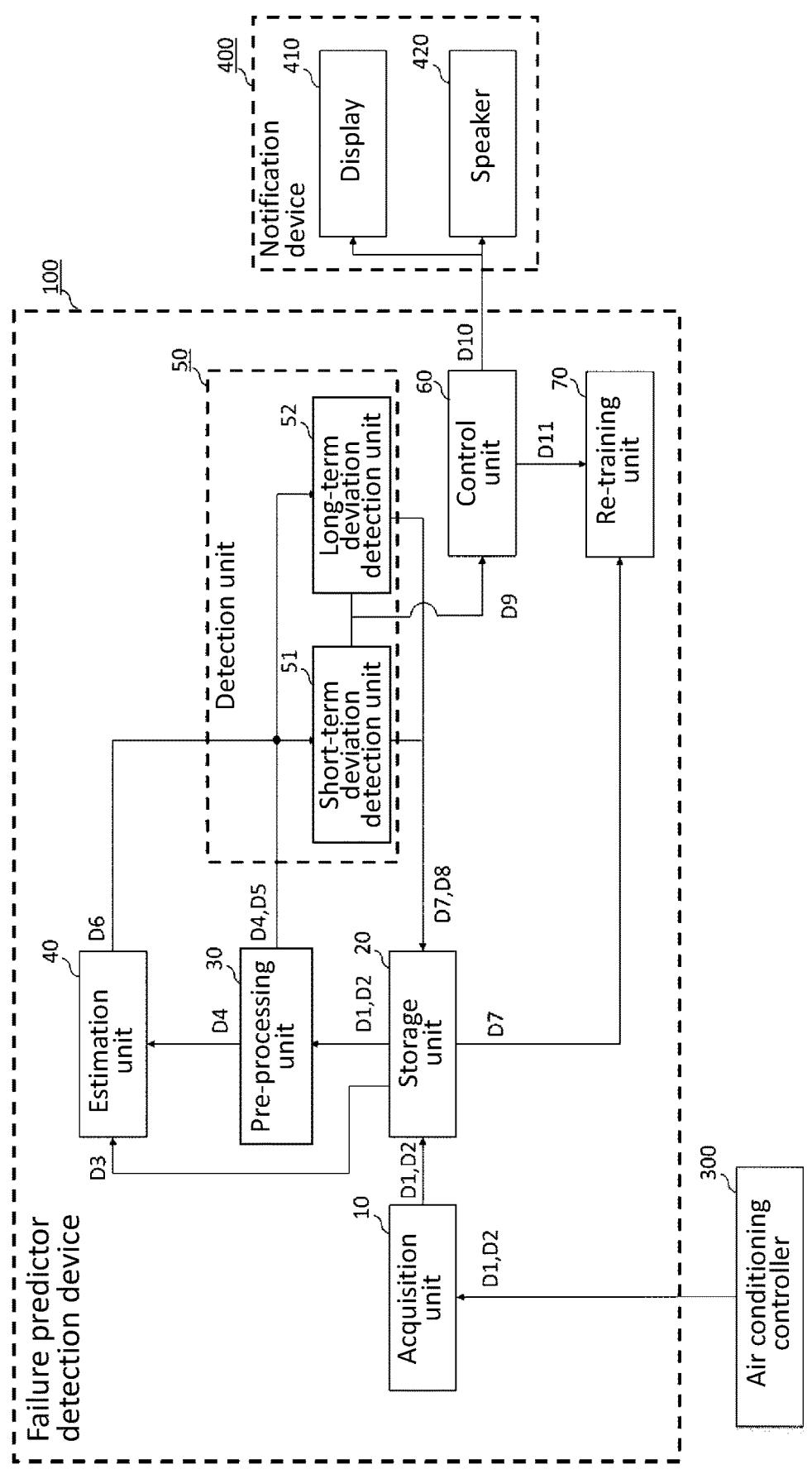
FIG. 3 is a diagram showing a configuration of a failure predictor detection device 100 and a notification device 400 according to Embodiment 1.

FIG. 3 is a diagram showing a configuration of the failure predictor detection device 100 and the notification device 400 according to Embodiment 1. The notification device 400 will be described first, and then the failure predictor detection device 100 will be described.

The notification device 400 gives a notification to the user of the failure predictor detection device 100 on the basis of a signal from the failure predictor detection device 100. The notification is mainly on the failure predictor. In Embodiment 1, a display 410 and a speaker 420 are provided.

The display 410 gives a visual notification to the user, and the speaker 420 gives an auditory notification to the user.

Next, the failure predictor detection device 100 will be described. The failure predictor detection device 100 is a device that detects the failure predictor of connected equipment, which more specifically is a device that is capable of distinguishing and thus detecting the failure predictor of the equipment and an environmental change around the equipment by comparing an estimated value obtained from a learning model and a measured value at multiple times.

In Embodiment 1, the failure predictor detection device 100 includes an acquisition unit 10, a storage unit 20, a pre-processing unit 30, an estimation unit 40, a detection unit 50, a control unit 60, and a re-training unit 70.

The acquisition unit 10 acquires estimation data D1 and comparison data D2 of the equipment that is a failure predictor detection target in a target time period of the failure predictor detection. In Embodiment 1, the acquisition unit 10 acquires the estimation data D1 and the comparison data D2 from the air conditioning controller 300. The estimation data D1 and the comparison data D2 are the above-mentioned outdoor environment information, the outdoor unit information, the indoor environment information, the indoor unit information, the setting information, and the operation information, which shall collectively be referred to as air conditioning data. In Embodiment 1, the comparison data shall show a compressor frequency of the air conditioner AC, and the estimation data shall show a value other than the compressor frequency, such as at least one of the following: a time of day (schedule), a power consumption, an outdoor temperature, a room temperature, a set temperature, an operating condition, a refrigerant temperature, values from various thermistors, a fan speed, and values from various pressure sensors. Since the compressor frequency is set to the comparison data, a failure predictor in any part of the entire air conditioner can be detected with high accuracy. If it is required, however, to detect a failure predictor in each specific part, simply change the input/output data to data showing different information from the above, as appropriate.

The storage unit 20 stores various types of information. In Embodiment 1, the storage unit 20 stores a trained learning model D3 trained by the training device 200, the estimation data D1 and the comparison data D2 acquired by the acquisition unit 10, and training data D7 and evaluation data D8 acquired by providing the comparison data and the estimation data with a detection result of the detection unit 50, which will be described later.

The storage unit 20 outputs the trained learning model D3, the estimation data D1, and the comparison data D2 in batches to the pre-processing unit 30. In other words, the storage unit 20 outputs the air conditioning data and the trained learning model D3 stored in a predetermined time period to the pre-processing unit 30 after every such predetermined time period.

In Embodiment 1, the storage unit 20 stores various data, but the configuration is not limited to this. Instead of the storage unit 20, one or more network storage devices (not shown) provided on a communication network NW may be configured to store various data and be accessed by the pre-processing unit 30, the estimation unit 40, and the re-training unit 70. This makes it possible to build, outside the failure predictor detection device 100, a database storing the air conditioning data acquired by the acquisition unit 10, and the training data D7 and the evaluation data D8 acquired by providing a detection result to the air conditioning data in the detection unit 50.

The pre-processing unit 30 performs pre-processing of data on the inputted estimation data D1 and the inputted comparison data D2, outputs estimation data D4 after the pre-processing to the estimation unit 40, and outputs the estimation data D4 after the pre-processing and comparison data D5 after the pre-processing to the detection unit 50. More specifically, the pre-processing unit 30 performs processing such as calculation of a moving average and selection of data to be used for the air conditioning data, which are time-series batch data inputted by the storage unit 20, outputs the estimation data D4 after the pre-processing to the estimation unit 40, and outputs the estimation data D4 after the pre-processing and the comparison data D5 after the pre-processing to the detection unit 50. The selection of data includes, for example when only a portion of data with a small variance is to be used, setting a threshold for the variance value and selecting data whose variance is equal to or smaller than the threshold. The threshold value for the variance value may be set manually, or by using a threshold value for the variance value when an evaluation value used for creating a normal operation model by the training device, described later, takes its maximum value.

In Embodiment 1, the pre-processing unit 30 selects the estimation data D4 and the comparison data D5 in a time period when the variance value is smaller than a predetermined selection threshold, from among the estimation data D1 and the comparison data D2 acquired by the acquisition unit 10, and outputs them to the estimation unit 40 and the detection unit 50.

The estimation unit 40 calculates the estimated value for the comparison data D5 in the normal operation from the estimation data D4 using the learning model D3. In Embodiment 1, the estimation unit 40 calculates the estimated value using the estimation data D4 selected by the pre-processing unit 30. In addition, the estimation unit 40 outputs estimated data D6 showing the obtained estimated value to the detection unit 50.

Also, in Embodiment 1, the estimation unit 40 calculates the estimated value of the compressor frequency in the air conditioner AC from the estimation data D4 using the learning model D3.

In Embodiment 1, the estimation unit 40 uses the normal operation model as the learning model D3. Here, the normal operation model is a learning model obtained by machine learning using data during the normal operation of equipment, the model representing behavior of the equipment in its normal operation for the detection of the failure predictor. That is, the learning model D3 takes as input the estimation data D4, which shows information other than the comparison data D5 from among the air conditioning data, and outputs the value during the normal operation corresponding to the information shown by the comparison data D5. For the machine learning method, an existing learning method such as regression analysis can be used, and also in Embodiment 1, the regression analysis is used as the learning method.

In Embodiment 1, the estimated value calculated by the estimation unit 40 includes a prediction range. The estimation unit 40 may directly calculate the estimated value with a prediction range as the output of the learning model, or alternatively may obtain the estimated value with a prediction range as the output of the learning model by calculating a real value and then giving a predetermined region to the real value.

The detection unit 50 detects a failure predictor of equipment on the basis of comparison results at multiple times between an estimated value calculated by the estimation unit 40 and a measured value shown by the comparison data D5. In Embodiment 1, the detection unit 50 detects the failure predictor of the equipment on the basis of the comparison results at multiple times between the estimated value calculated by the estimation unit 40 and the measured value shown by the comparison data D5 selected by the pre-processing unit 30.

In Embodiment 1, the detection unit 50 detects an insulation failure of the air conditioner on the basis of the estimated value of the compressor frequency calculated by the estimation unit and the measured value of the compressor frequency shown by the comparison data.

In Embodiment 1, the detection unit 50 calculates a degree of deviation between the estimated value and the measured value and detects the failure predictor of the equipment when the degree of deviation increases over time. In addition, the detection unit 50 detects a failure predictor of the equipment or an environmental change around the equipment when such degree of deviation exceeds a predetermined threshold at multiple times. More specifically, the detection unit 50 detects the failure predictor of the equipment or the environmental change around the equipment by extracting portions where the degree of deviation exceeds the predetermined threshold and by performing processes of a short-term deviation detection unit 51 and a long-term deviation detection unit 52, described later, for each of the extracted portions. The details of these processes will be described in the descriptions of the short-term deviation detection unit 51 and the long-term deviation detection unit 52.

In Embodiment 1, the detection unit 50 uses, as the degree of deviation, the shortest distance between the prediction range and the air conditioning data after the pre-processing. The above distance is measured in a space established by the base of the air conditioning data. If the air conditioning data is included in the prediction range, the distance shall be zero. In this case, the predetermined threshold for the detection unit 50 to detect the failure predictor or the environmental change should be set to zero.

In Embodiment 1, the detection unit 50 includes the short-term deviation detection unit 51 and the long-term deviation detection unit 52.

The short-term deviation detection unit 51 detects a short-term environmental change around the equipment when the time period during which the degree of deviation exceeded the predetermined threshold is shorter than a predetermined time period. That is, the short-term deviation detection unit 51 compares the estimated value given by the estimation unit 40 with the measured value shown by the comparison data D5 inputted from the pre-processing unit 30 and detects an event in which the deviation is temporarily found and then finally disappears. Then, the short-term deviation detection unit 51 outputs, to the control unit 60, a detection result D9 showing whether the short-term deviation exists in a targeted time period for the failure predictor detection.

For example, in Embodiment 1, the short-term deviation detection unit 51 detects a short-term deviation when the air conditioning data after the pre-processing exists temporarily outside the prediction range and then exists, a certain time later, inside the prediction range. What is detected by the short-term deviation detection unit 51 is neither the failure predictor of the air conditioner nor a long-term environmental change, so that the data that is deviated only for a short period of time is stored in the storage unit as the training data D7 with a label of the short-term environmental change assigned thereto.

The short-term environmental change is an environmental change in which the environment changes from its original only for a short period of time and returns to its original after some time, such as a change caused by opening and closing of a window. As for the predetermined time period mentioned above, the setting should be performed in accordance with the targeted equipment for the failure predictor detection. For example, in the case of air conditioners, the setting should be from a few minutes to a few hours.

The long-term deviation detection unit 52 detects the failure predictor of the equipment or the long-term environmental change around the equipment when the time period during which the degree of deviation exceeded the predetermined threshold is equal to or longer than the predetermined time period. In addition, the long-term deviation detection unit 52 outputs the detection result D9 to the control unit 60, the detection result D9 showing whether the long-term deviation exists in the targeted time period for the failure predictor detection and, if it exists, whether the deviation is due to the failure predictor or due to the long-term environmental change.

The long-term environmental change is an environmental change in which the environment changes from its original over a long period of time, such as a layout change in a room. The predetermined time period may be determined as in the short-term deviation detection unit 51, and the same value as used therein may be used.

The long-term deviation detection unit 52 detects the long-term deviation when, for example in Embodiment 1, the air conditioning data after the pre-processing exists outside the prediction range for the predetermined time period or longer.

Also, in Embodiment 1, the long-term deviation detection unit 52 detects the failure predictor of the equipment when the degree of deviation increases over time. In addition, the long-term deviation detection unit 52 detects the long-term environmental change in a case where the degree of deviation is equal to or larger than the predetermined threshold but does not increase over time. This is based on an idea that in the case of the failure predictor, the degree of deviation becomes larger because the equipment failure gets worse over time, and in the case of the long-term environmental change, the degree of deviation remains almost constant because the change once made due to the layout change or the like rarely progresses over time.

More specifically, the long-term deviation detection unit 52 calculates, for example, an integrated value of the differences of the data which is next to each other in time from among the time series data showing the distance between the measured value shown by the comparison data and the estimated value obtained by the learning model. In a case of the change in the environment, it is expected that the estimated value shown by the comparison data and the measured value obtained by the learning model each have a small variance, and thus, the difference from a previous step in chronological order is small. On the other hand, in a case of the failure predictor due to deterioration, it is expected that the variance of the distance between the measured value and the estimated value gradually increases, and thus, the difference from a previous step in chronological order is large. Therefore, by determining whether the integrated value of the difference exceeds the predetermined threshold, it is possible to determine whether the long-term deviation is due to the failure predictor or the long-term environmental change.

When the long-term environmental change is detected, the long-term deviation detection unit 52 assigns a label, showing that the data is that after the long-term environmental change, to the data acquired after the timing of such detection and stores the labelled data in the storage unit 20 as the training data D7. On the other hand, when the failure predictor is detected, the long-term deviation detection unit 52 assigns a label, showing that the data is for the failure predictor, to the data acquired after the timing of such detection and stores the labelled data in the storage unit 20 as the evaluation data D8, the stored data here not being used for the training in future but used for the training of the learning model by the training device 200, which will be described later.

The control unit 60 performs various controls in accordance with the detection result D9 of the detection unit 50. In Embodiment 1, the control unit 60 sends a control signal D10 to the notification device to cause it to notify of the failure predictor when the long-term deviation detection unit 52 detects the failure predictor. The control unit 60 sends a control signal D11 to cause the re-training unit 70, described later, to perform re-training of the learning model when the long-term deviation detection unit 52 detects the long-term environmental change.

When the long-term deviation detection unit detects the long-term environmental change, the re-training unit 70 performs the re-training of the learning model using, as the training data D7, the estimation data and the comparison data of the time period after the time when the long-term deviation detection unit detects the long-term environmental change. More specifically, the re-training unit 70 performs the re-training using the data, stored in the storage unit 20, with the label of "after the long-term environmental change" assigned.

Figure 4:
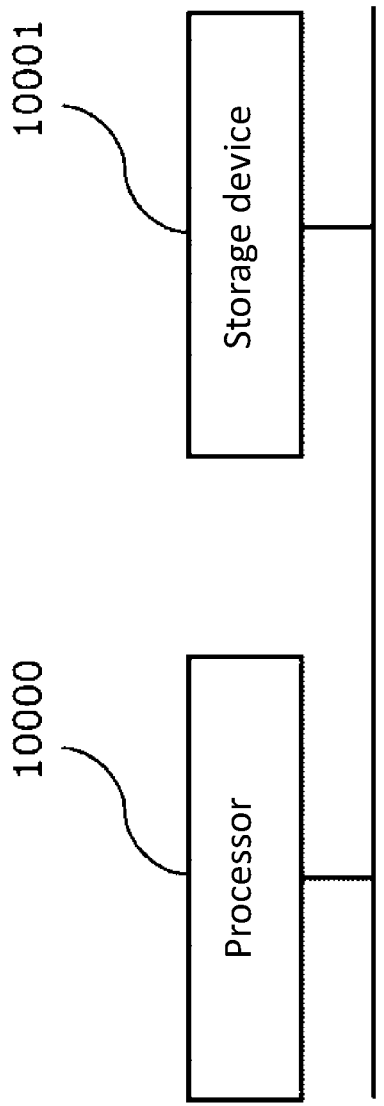
FIG. 4 is a hardware configuration diagram showing a hardware configuration of the failure predictor detection device 100 according to Embodiment 1.

Next, a hardware configuration of the failure predictor detection device 100 according to Embodiment 1 will be described. Each of the functions of the failure predictor detection device 100 is realized by a computer. FIG. 4 is a configuration diagram showing an example of a hardware configuration of the computer that realizes the failure predictor detection device 100.

The hardware, shown in FIG. 4, includes a processor 10000 such as a central processing unit (CPU), and a storage device 10001 such as a read only memory (ROM) and a hard disk.

The acquisition unit 10, the storage unit 20, the pre-processing unit 30, the estimation unit 40, the detection unit 50, the control unit 60, and the re-training unit 70, shown in FIG. 3, are realized by a program, stored in the storage device 10001, being executed by the processor 10000, and the storage unit 20 is realized by the storage device 10001.

Here, the configuration is not limited to a configuration realized by a single processor 10000 and a single storage device 10001 but may be realized by a plurality of processors 10000 and storage devices 10001.

The method for realizing the functions of the failure predictor detection device 100 is not limited to a combination of hardware and a program described above, but may be realized by hardware alone, such as a large-scale integrated circuit (LSI), which is a processor having a program implemented, or by both dedicated hardware for some functions and a combination of a processor and a program for other functions.

The failure predictor detection device 100 according to Embodiment 1 is configured as described above.

Figure 5:
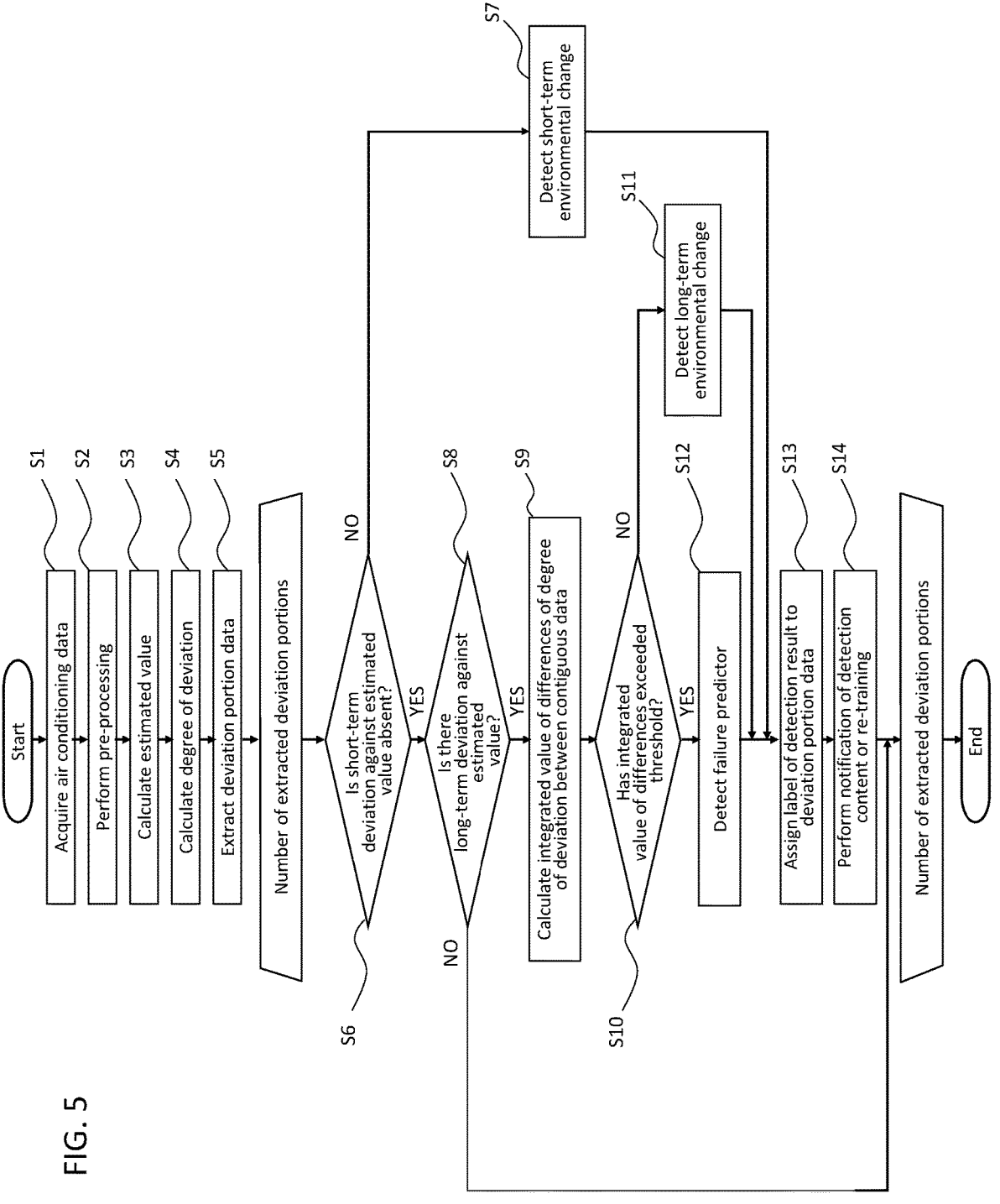
FIG. 5 is a flowchart showing actions of the failure predictor detection device 100 according to Embodiment 1.

Next, actions of the failure predictor detection device 100 according to Embodiment 1 will be described. FIG. 5 is a flowchart showing the actions of the failure predictor detection device 100 according to Embodiment 1. The actions of the failure predictor detection device 100 correspond to a failure predictor detection method, and the program to make the computer perform the actions of the failure predictor detection device 100 corresponds to a failure predictor detection program. The action of the acquisition unit 10 correspond to an acquisition process; the action of the storage unit 20 correspond to a storage process; the action of the pre-processing unit 30 correspond to a pre-processing process; the action of the estimation unit 40 correspond to an estimation process; the action of the detection unit 50 correspond to a detection process; the action of the control unit 60 correspond to a control process; and the action of the re-training unit 70 corresponds to a re-training process.

First, in Step S1, the acquisition unit 10 acquires the estimation data and the comparison data for the targeted equipment of the failure predictor detection obtained during the targeted time period for the failure predictor detection from the storage unit 20.

Then, in Step S2, the pre-processing unit 30 performs the pre-processing on the estimation data and the comparison data. More specifically, the pre-processing unit 30 selects the data with a small variance of sensor values from among the estimation data and the comparison data and outputs the selected data to the estimation unit 40 and the detection unit 50.

Next, in Step S3, the estimation unit 40 calculates the estimated value for the comparison data during the normal operation from the estimation data using the learning model.

Next, in Step S4, the detection unit 50 calculates the degree of deviation between the estimated value obtained by the normal operation model and the measured value shown by the comparison data.

Next, in Step S5, the detection unit 50 extracts portions where the degree of deviation exceeds the predetermined threshold as deviation portion data. Here, the deviation portion data is a set of the estimated value and the estimation data. The failure predictor detection device 100 repeats the processes from Step S6 to Step S14 for each extracted deviation portion data for the number of the extracted deviation portions.

In Step S6, the short-term deviation detection unit 51 determines whether the short-term deviation is absent between the estimated value and the measured value.

A concrete example of the process where the short-term deviation detection unit 51 detects the short-term environmental change will be described with reference to FIG. 6.

Figure 6:
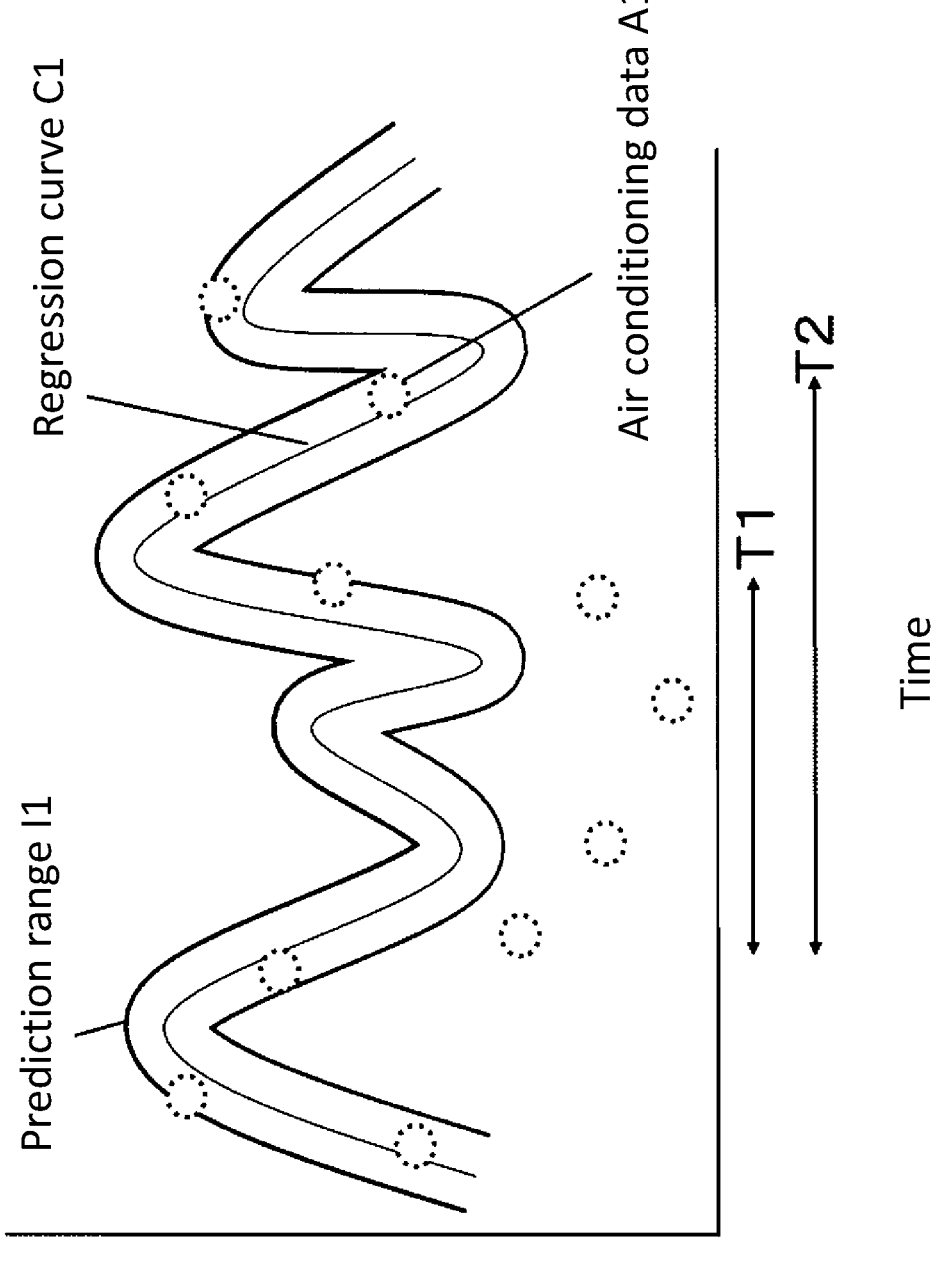
FIG. 6 is a conceptual diagram to illustrate a process of a short-term deviation detection unit 51 detecting a short-term environmental change according to Embodiment 1.

FIG. 6 is a conceptual diagram to illustrate the process of the short-term deviation detection unit 51 detecting the short-term environmental change according to Embodiment 1. In FIG. 6, the solid line represents a regression curve C1, the band curve with a width represents a prediction range I1, and the white circle represents acquired air conditioning data A1. Here, a value shown by the estimation data corresponds to a value on the horizontal axis of the air conditioning data A1, and a value shown by the comparison data corresponds to a value on the vertical axis of the air conditioning data A1. The regression curve C1 is acquired as the output when the estimation data is inputted to the learning model. Here, the regression curve C1 and the prediction range I1 are collectively referred to as the estimated value.

The short-term deviation detection unit 51 detects, in a certain time period T1 shown in FIG. 6, the presence of the data for which the degree of deviation exceeds the predetermined threshold value, in other words, the presence of the data which is not within the region of the prediction range I1 and shows the deviation between the estimated value and the measured value, in the air conditioning data A1. Then, the short-term deviation detection unit 51 compares the time period T1, in which there is a deviation between the estimated value and the measured value, with a predetermined time period T2, and detects the short-term environmental change when T1 is shorter than T2.

If it is determined as NO in Step S6, in other words, if it is determined that there is the short-term deviation, then the process proceeds to Step S7; and the short-term deviation detection unit 51 detects the short-term environmental change because it is determined that there is the short-term deviation in Step S5.

If it is determined as YES in Step S6, in other words, if it is determined that there is no short-term deviation, then the process proceeds to Step S8.

In Step S8, the long-term deviation detection unit 52 determines whether there is a long-term deviation between the estimated value and the measured value.

Figure 7:
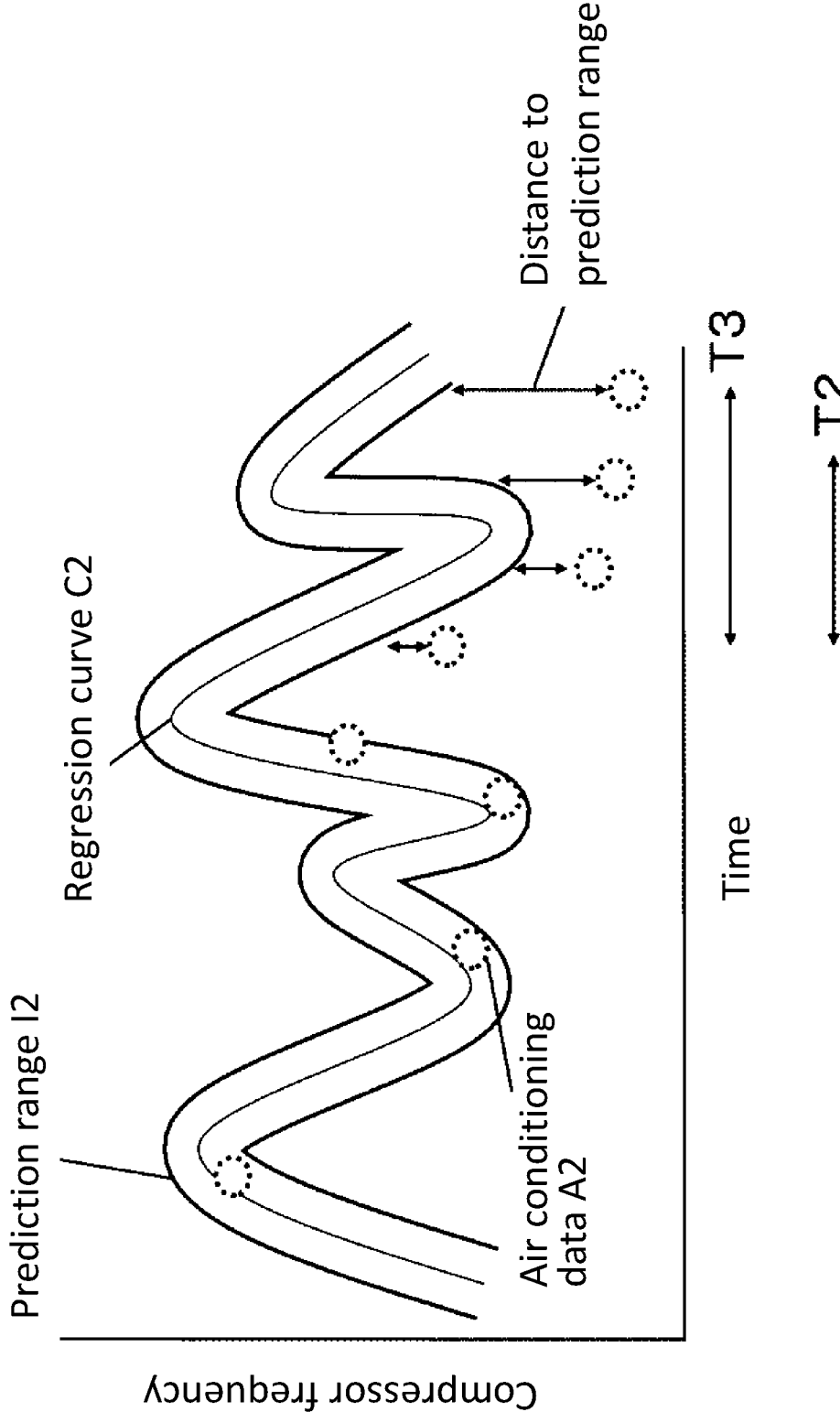
FIG. 7 is a conceptual diagram to illustrate a concrete example of a process where a long-term deviation detection unit 52 detects a failure predictor or a long-term environmental change according to Embodiment 1.

A concrete example of the process where the long-term deviation detection unit 52 detects the failure predictor or the long-term environmental change will be described with reference to FIG. 7. FIG. 7 is a conceptual diagram to illustrate the concrete example of the process where the long-term deviation detection unit 52 detects the failure predictor or the long-term environmental change according to Embodiment 1.

In FIG. 7, as in FIG. 6, the solid line represents a regression curve C2, the band curve with a width represents a prediction range 12, and the white circle represents acquired air conditioning data A2. The long-term deviation detection unit 52 detects, in a certain time period T3 shown in FIG. 7, the presence of the data for which the degree of deviation exceeds the predetermined threshold value, in other words, the presence of the data which is not within the region of the prediction range 12 and shows the deviation between the estimated value and the measured value, in the air conditioning data A2. Then, the long-term deviation detection unit 52 compares the time period T3 in which there is a deviation between the estimated value and the measured value, with a predetermined time period T2, and detects the failure predictor or the long-term environmental change when T3 is longer than T2.

If it is determined as NO in Step S8, there is no deviation between a value during the normal operation and the measured value, so that the failure predictor detection device 100 determines that there is no failure predictor and no environmental change, to end the process.

If it is determined as YES in Step S8, the process proceeds to Step S9, and the long-term deviation detection unit 52 calculates the integrated value of the differences of the degree of deviation between contiguous data from the beginning to the end of the deviation portion data.

Next, in Step S10, the long-term deviation detection unit 52 determines whether the integrated value of the differences is equal to or larger than the threshold.

If it is determined as NO in Step S10, the process proceeds to Step S11, and the long-term deviation detection unit 52 detects the long-term environmental change because the integrated value of the differences is neither equal to nor larger than the threshold value. If it is determined as YES in Step S10, the process proceeds to Step S12, and the long-term deviation detection unit 52 detects the failure predictor because the integrated value of the differences is equal to or larger than the threshold value.

In Step S9 to Step S12 above, the long-term deviation detection unit 52 determines whether the long-term deviation detected in Step S8 is due to the failure predictor of the equipment or due to the environmental change. A concrete example of the processes of Step S9 to Step S12 will be described below.

Figure 8:
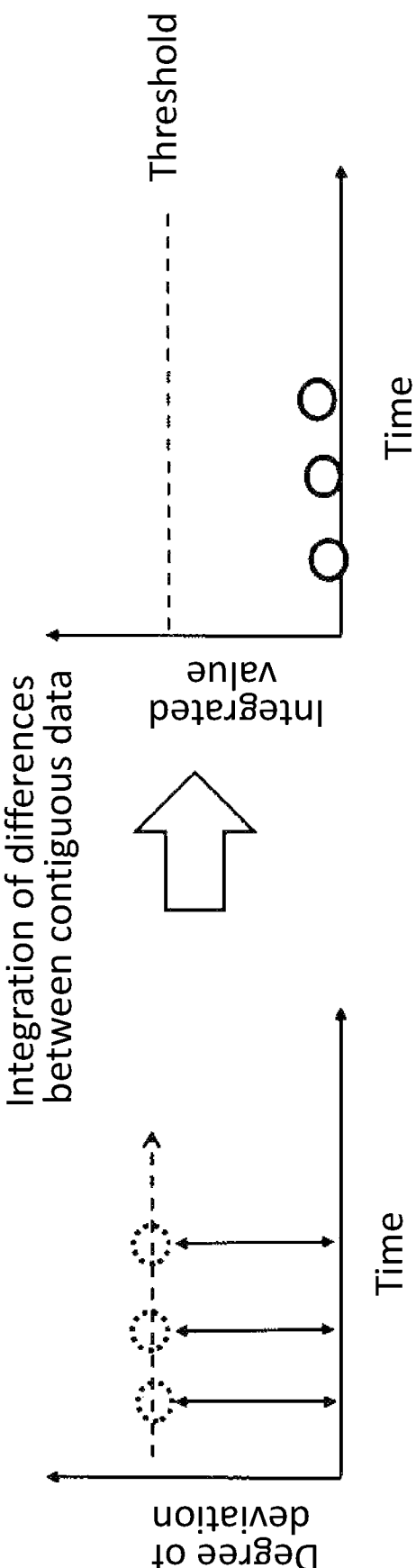
FIG. 8 is a conceptual diagram to illustrate a concrete example of a process where the long-term deviation detection unit 52 detects a long-term environmental change according to Embodiment 1.

The process of the long-term deviation detection unit 52 detecting the long-term environmental change according to Embodiment 1 will be described with reference to FIG. 8. FIG. 8 is a conceptual diagram to illustrate the concrete example of the process where the long-term deviation detection unit 52 detects the long-term environmental change according to Embodiment 1.

Shown on the left in FIG. 8 is the time change in the degree of deviation and on the right in FIG. 8 is the integrated value of the differences of the degree of deviation. The long-term deviation detection unit 52 integrates the difference between the degree of deviation at a certain time and the degree of deviation at a previous time of the certain time and checks whether the integrated value is equal to or larger than the predetermined threshold. In a case where the degree of deviation is nearly constant and the integrated value is smaller than the predetermined threshold, as shown in FIG. 8, the long-term deviation detection unit 52 detects the long-term environmental change.

Figure 9:
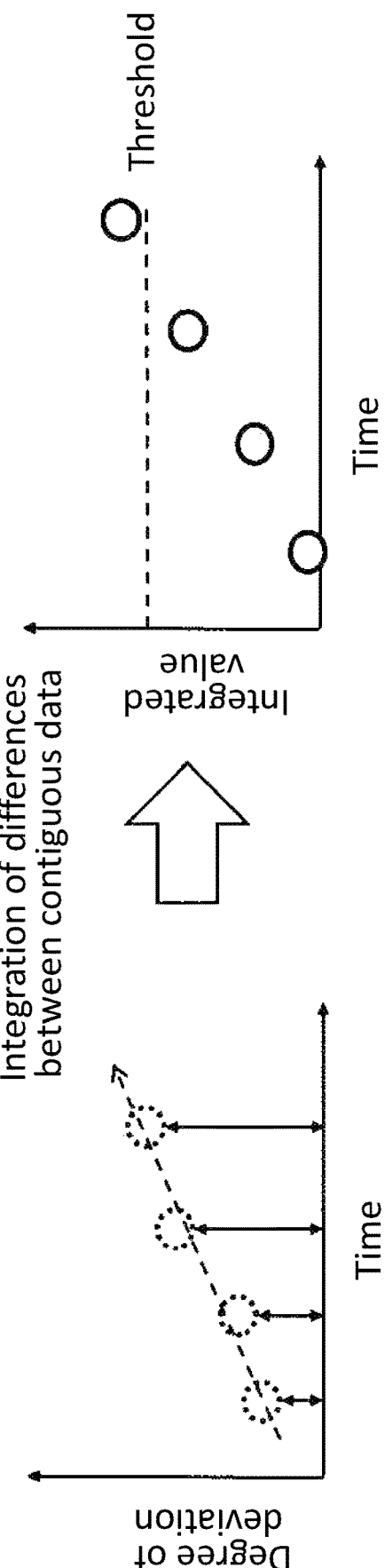
FIG. 9 is a conceptual diagram to illustrate a concrete example of a process where the long-term deviation detection unit 52 detects a failure predictor according to Embodiment 1.

Next, the process of the long-term deviation detection unit 52 detecting the failure predictor according to Embodiment 1 will be described with reference to FIG. 9. FIG. 9 is a conceptual diagram to illustrate a concrete example of the process where the long-term deviation detection unit 52 detects the failure predictor according to Embodiment 1.

As in FIG. 8, shown on the left in FIG. 9 is the time change in the degree of deviation and on the right in FIG. 9 is the integrated value of the differences of the degree of deviation. The long-term deviation detection unit 52 integrates the difference between the degree of deviation at a certain time and the degree of deviation at a previous time of the certain time and checks whether the integrated value is equal to or larger than the predetermined threshold. If the degree of deviation increases over time and the integrated value is equal to or larger than the predetermined threshold, as shown in FIG. 9, the long-term deviation detection unit 52 detects the failure predictor.

Returning to the flowchart in FIG. 5, the rest of the actions will be described. After Step S7, Step S11, and Step S12, the process proceeds to Step S13. When the short-term deviation detection unit 51 or the long-term deviation detection unit 52 detects a deviation, it assigns a label corresponding to the detection result to the data of the deviation portion and stores the data with the label in the storage unit. Also, the short-term deviation detection unit 51 or the long-term deviation detection unit 52 outputs the detection result to the control unit.

Finally, in Step S14, the control unit 60 performs various controls on the basis of the received detection result. For example, the control unit 60 makes the re-training unit perform the re-training if the detection result is the long-term environmental change and makes the notification device 400 notify of the failure predictor if the detection result is the failure predictor. If the detection result is the short-term environmental change, the control unit 60 may make the notification device 400 notify of the short-term environmental change or omit the process of Step S14. The failure predictor detection device 100 repeats the processes from Step S6 to Step S14 for the number of the extracted deviation portions.

By operating as described above, the failure predictor detection device 100 according to Embodiment 1 detects the failure predictor of the equipment on the basis of the comparison results at multiple times between the estimated value and the measured value, thereby reducing the possibility of the false detection erroneously determining that the environmental change around the equipment is the failure predictor and thus more appropriately detecting the failure predictor.

Also, the failure predictor detection device 100 according to Embodiment 1 calculates the degree of deviation between the estimated value and the measured value and detects the failure predictor of the equipment when the degree of deviation increases over time, thereby preventing more appropriately the long-term environmental change such as the layout change from being erroneously detected as the failure predictor and thus detecting more appropriately the failure predictor.

In addition, the failure predictor detection device 100 according to Embodiment 1 detects the failure predictor of the equipment or the environmental change around the equipment when the degree of deviation exceeds the predetermined threshold at multiple times, thereby more appropriately preventing a momentary exceedance of the threshold from being erroneously detected as the failure predictor.

In addition, the failure predictor detection device 100 according to Embodiment 1 detects the short-term environmental change around the equipment when the time period during which the degree of deviation exceeds the threshold is shorter than the predetermined time and detects the failure predictor or the long-term environmental change of the equipment when the time period during which the degree of deviation exceeds the threshold is longer than the predetermined time, thereby distinguishing the short-term environmental change and the long-term environmental change among the environmental changes and thus preventing more appropriately the false detection of the failure predictor. In cases where there is the deviation caused by the environmental change, the re-training of the learning model is required when there is the long-term environmental change such as a layout change in the room, but the re-training of the learning model may not be required when there is only the short-term environmental change such as a window opening. By distinguishing such long-term environmental change and the short-term environmental change in their detection, it is possible to determine whether the re-training is required.

In addition, the failure predictor detection device 100 according to Embodiment 1 selects the estimation data and the comparison data of the time period during which the variance value is smaller than the predetermined selection threshold and outputs the selected data to the detection unit, thereby preventing more appropriately the false detection of the failure predictor caused by using the data obtained in the time period during which the variance value is large and unstable.

In addition, the failure predictor detection device 100 according to Embodiment 1 is connected to the notification device 400 for notifying the user using the failure predictor detection device 100 and makes a notification to that effect from the notification device 400 when the failure predictor is detected, so that it is possible to make the user recognize the failure predictor.

In addition, when the long-term environmental change is detected, the failure predictor detection device 100 according to Embodiment 1 performs the re-training of the learning model using, as the re-training data, the estimation data and the comparison data obtained from the time period after the time when the long-term deviation detection unit detects the long-term environmental change, thereby improving the situation where the estimation by the learning model is not working well due to the long-term environmental change caused by the layout change or the like. This also saves the user from the troublesome task of having to set up the data for the re-training and running the device to perform the re-training.

In Embodiment 1, in which the target of the failure predictor detection of the failure predictor detection device is an air conditioner, the compressor frequency of the air conditioner is estimated using the learning model, so that a thermal insulation failure, among the failures of the air conditioner, can be appropriately detected.

In the operation of the failure predictor detection device 100 described above, the notification of the detection result and the re-training are included in the loop processing as shown in FIG. 5, but the notification of the detection result and the re-training may be performed after the loop processing is completed and the results of all loop processes are integrated.

The description of the inference phase is concluded here to proceed to description of the training phase.

<Training Phase>

Figure 10:
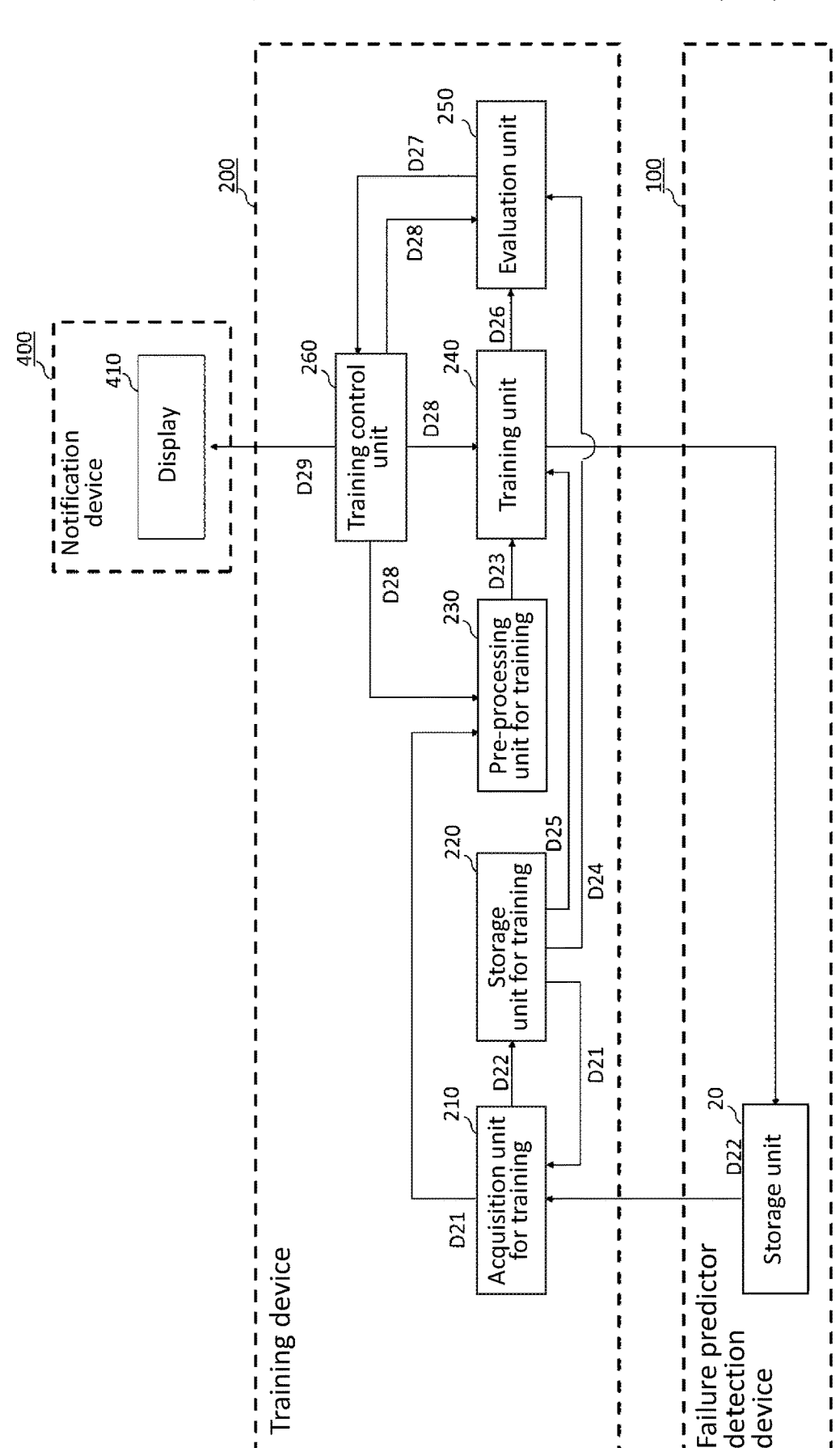
FIG. 10 is a diagram showing a configuration of a training device 200 according to Embodiment 1.

The training phase, in which training of the learning model to be used in the inference phase is performed, will be described. FIG. 10 is a diagram showing a configuration of the training device 200 according to Embodiment 1. The training device 200 trains the learning model using the data during the normal operation of the equipment to generate the learning model.

In Embodiment 1, the training device 200 includes an acquisition unit for training 210, a storage unit for training 220, a pre-processing unit for training 230, a training unit 240, an evaluation unit 250, and a training control unit 260.

The acquisition unit for training 210 acquires training data D21 to be used for the training of the learning model. The training data represents the same type of information as the comparison data and the estimation data used in the failure predictor detection device 100 and the values acquired during the normal operation of the equipment. That is, in Embodiment 1, the acquisition unit for training 210 acquires the training data during the normal operation of the equipment.

In Embodiment 1, the acquisition unit for training 210 acquires the training data D21 stored in the storage unit for training 220 described later, but when training data D22 stored in the storage unit 20 of the failure predictor detection device 100, the acquisition unit for training 210 acquires the training data D22 from the storage unit 20 in advance before the training and stores the acquired training data D22 in the storage unit for training 220. Then, not only the training data D21 but also the training data D22 are acquired. Then, not only the training data D21 but also the training data D22 are acquired.

The pre-processing unit for training 230 performs the pre-processing of the training data D21 and selects, in Embodiment 1, the data of the time period during which the variance value is smaller than the predetermined selection threshold from among the training data D21 acquired by the acquisition unit for training 210 as the data for the training of the learning model. Here, in Embodiment 1, since the output of the learning model is set to the compressor frequency, the data of the time period during which the variance value of the compressor frequency is smaller than the predetermined selection threshold is selected as the data to be used for the training. Then, the pre-processing unit for training 230 outputs the selected training data D23 to the training unit 240.

If the selection of training data is not performed and thus the data whose variance value is large is used for the training, the training of the learning model cannot be performed well and a problem that the learning model making inaccurate estimation is generated.

Figure 11:
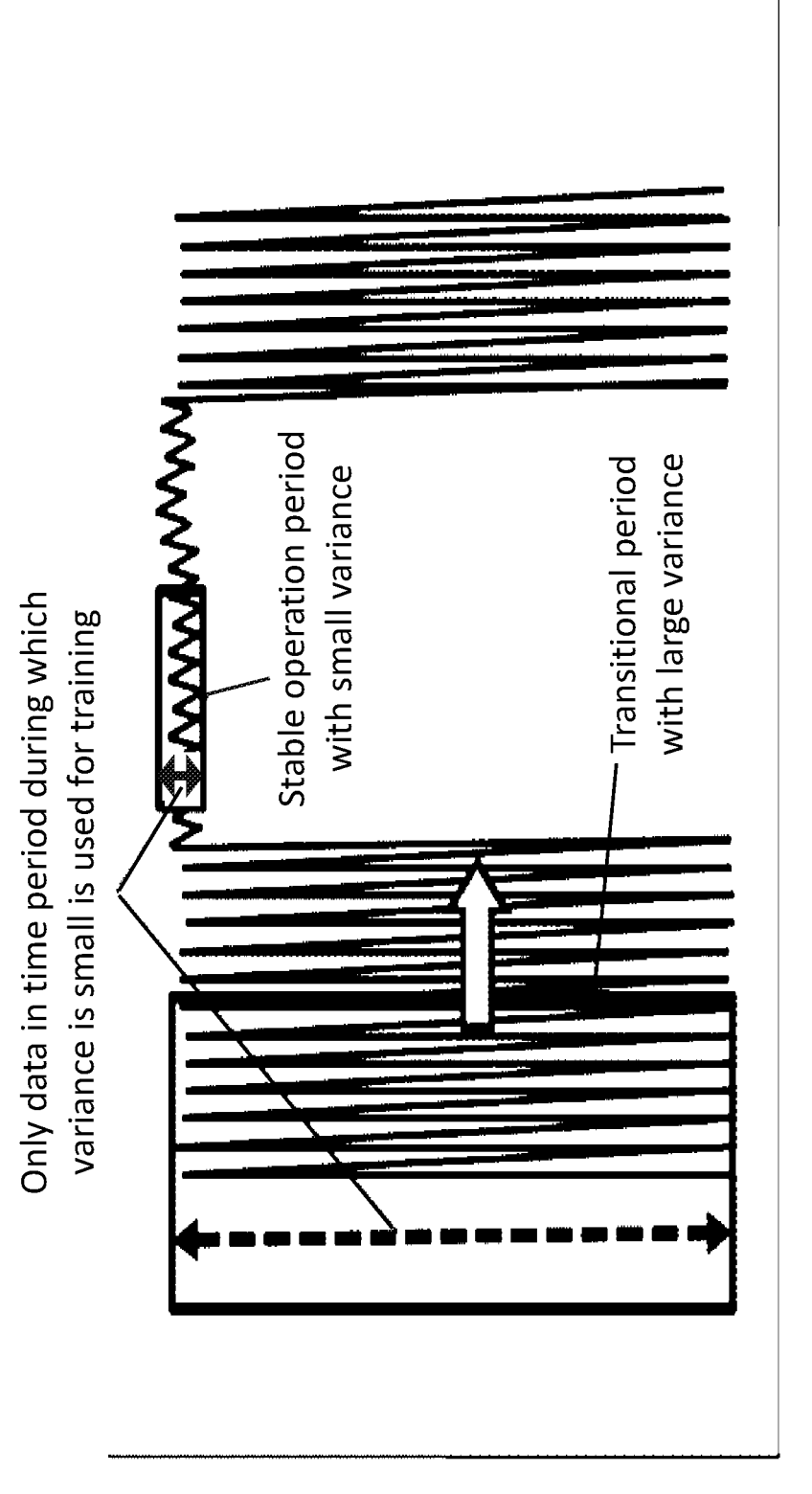
FIG. 11 is a conceptual diagram to illustrate a concrete example of a processing of a pre-processing unit for training 230 according to Embodiment 1.

A concrete example of the processing of the pre-processing unit for training 230 will be described with reference to FIG. 11. During the period when the difference between the room temperature and the target temperature is large and the air conditioner AC is operating stably, the data with a small variance of the sensor values is acquired, but during the transition period when the ON and OFF of the air conditioner are frequently switched after the room temperature once reaches the target temperature, the data with a large variance of the sensor values is acquired. In such a case, if the data with a large variance value is used as the training data, the training of the learning model may not be performed well. To solve the above problem, the pre-processing unit for training 230 uses the variance value of the sensor values to select the training data.

The storage unit for training 220 stores various information for the training, such as the training data D21, evaluation data D24, and the learning model D25. Here, when the learning model is re-trained in the failure predictor detection device 100, the learning model stored in the storage unit 20 of the failure predictor detection device 100 may be retrieved via the acquisition unit for training 210 and stored. When the evaluation data, in other words, the data with the failure predictor label is stored in the storage unit 20 of the failure predictor detection device 100, the evaluation data stored in the storage unit 20 of the failure predictor detection device 100 may be retrieved via the acquisition unit for training 210 and stored.

The training unit 240 trains the learning model D25 using the training data D23 selected by the pre-processing unit for training 230. In Embodiment 1, the learning model is trained by the regression analysis as described in the inference phase. The training unit 240 outputs the learning model D26 after the training to the evaluation unit 250.

The evaluation unit 250 evaluates the learning model D26 and calculates the evaluation value of the learning model D26. In Embodiment 1, the evaluation unit 250 acquires validation data of the normal operation data and the data with the failure predictor label from the storage unit for training 220 as the evaluation data D24. In addition, as the evaluation method to be used by the evaluation unit 250, a well-known technique such as coefficients of determination and regression errors can be used. In Embodiment 1, the evaluation unit 250 acquires the estimated value using the evaluation data D24, as the estimation unit 40 of the failure predictor detection device 100 does, and calculates the percentage of the estimated value existing inside and outside the prediction range as the evaluation value. The evaluation unit 250 outputs the information showing the calculated evaluation value to the training control unit 260 as evaluation information D27.

In a case where the validation data of the normal operation data is used as the evaluation data D24, by using the percentage of the evaluation data existing within the prediction range as the evaluation value, the evaluation value becomes higher as the evaluation data D24 exists more within the prediction range of the estimated value, which allows a higher evaluation for the correctness of the learning. In a case where the data with the failure predictor label is used as the evaluation data D24, by using the percentage of the evaluation data D24 existing outside the prediction range as the evaluation value, the evaluation value becomes higher as the evaluation data D24 exists more outside the prediction range, which allows a higher evaluation for the correctness of the learning.

Figure 12:
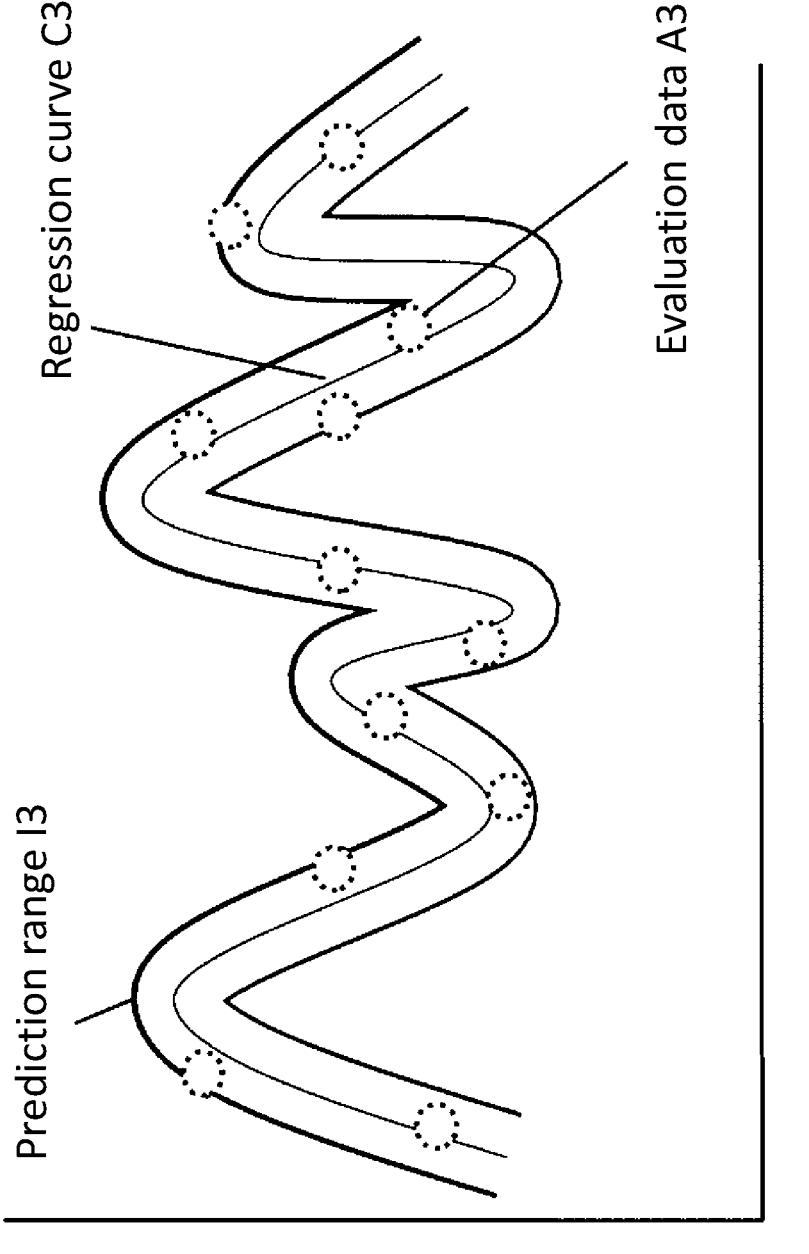
FIG. 12 is a conceptual diagram showing a concrete example of a learning model when an evaluation value is high.
Figure 13:
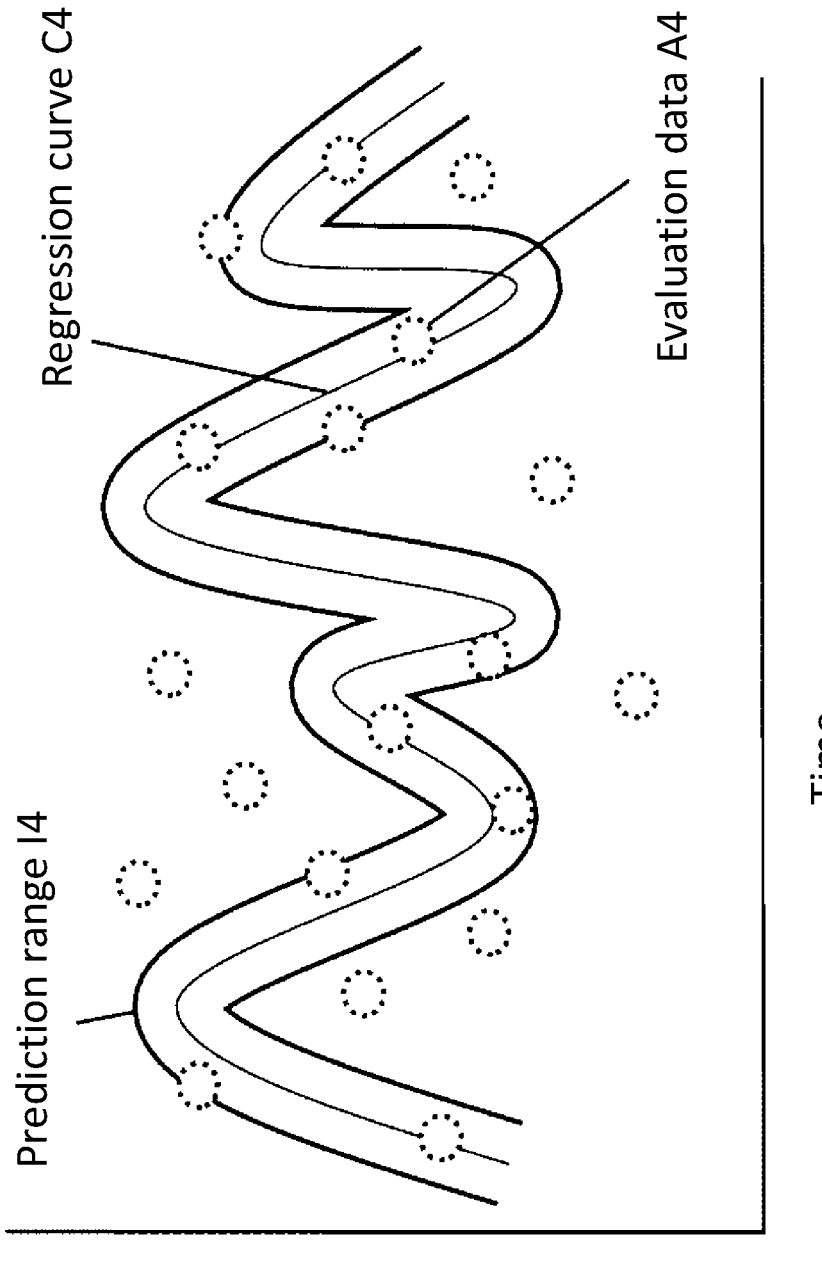
FIG. 13 is a conceptual diagram showing a concrete example of a learning model when the evaluation value is low.

Concrete examples of a learning model D26 that gives a high evaluation value and a learning model D26 that gives a low evaluation value will be described with reference to FIG. 12 and FIG. 13. FIG. 12 is a conceptual diagram showing a concrete example of the learning model D26 when the evaluation value is high. FIG. 13 is a conceptual diagram showing a concrete example of the learning model D26 when the evaluation value is low.

In FIG. 12 and FIG. 13, it is assumed that the evaluation data is all air conditioning data during the normal operation. In FIG. 12, the evaluation data A3 is all included in the prediction range 13, thereby showing a condition where the evaluation value is high and thus the learning was performed correctly. On the other hand, FIG. 13 shows that there is a lot of evaluation data A4 that is not included in the prediction range 14, thereby showing a condition where the evaluation value is low and thus the learning was not performed correctly.

Returning to FIG. 10, the description is continued about the configuration.

The training control unit 260 performs various controls on the training. In Embodiment 1, the training control unit 260 acquires a plurality of selection thresholds and makes an iterative processing in which search processing, being a series of processes including the selection by the pre-processing unit for training 230, the training by the training unit 240, and the evaluation by the evaluation unit 250, is performed repeatedly for each selection threshold be performed. That is, the training control unit 260 outputs a control command D28 to the pre-processing unit for training 230, the training unit 240, and the evaluation unit 250 to execute the iterative processing.

The training control unit 260 terminates the iterative processing on the basis of a predetermined termination condition and specifies, as the final selection threshold, the selection threshold with the highest evaluation value in the search processing at the point of the termination of the iterative processing. In Embodiment 1, the predetermined termination condition is such that the search processing is terminated when the number of searches reaches a predetermined number.

In addition, the training control unit 260, which is connected to the notification device 400, outputs a control command D29 to make the display 410 display the training result.

Figure 14:
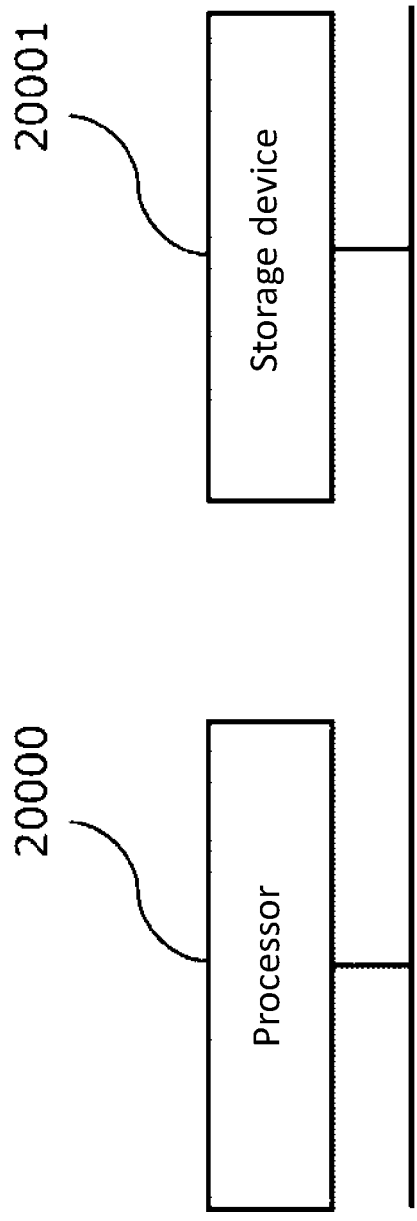
FIG. 14 is a hardware configuration diagram showing a hardware configuration of the training device 200 according to Embodiment 1.

Next, a hardware configuration of the training device 200 according to Embodiment 1 will be described. Each function of the training device 200 is realized by a computer. FIG. 14 is a configuration diagram showing a hardware configuration of the computer that realizes the training device 200.

The hardware shown in FIG. 14 includes a processor 20000 such as a central processing unit (CPU) and a storage device 20001 such as a read only memory (ROM) and a hard disk. In FIG. 10, the acquisition unit for training 210, the pre-processing unit for training 230, the training unit 240, and the evaluation unit 250 are realized by a program stored in the storage device 20001 being executed by the processor 20000, and the storage unit for training 220 is realized by the storage device 20001. Here, the configuration is not limited to a configuration realized by a single processor 20000 and a single storage device 20001 but may be realized by a plurality of processors 20000 and storage devices 20001. The method for realizing the functions of the training device 200 is not limited to a combination of the hardware and the program described above, but may be realized by hardware alone such as a large-scale integrated circuit (LSI), which includes a processor having a program implemented, or by both dedicated hardware for some functions and a combination of a processor and a program for other functions.

The training device 200 according to Embodiment 1 is configured as described above.

Next, actions of the training device 200 according to Embodiment 1 will be described. FIG. 15 is a flowchart showing the actions of the training device 200 according to Embodiment 1. The actions of the training device 200 correspond to a generation method of the trained learning model, and the program to make the computer perform the actions of the training device 200 corresponds to a trained learning model generation program. The action of the acquisition unit for training 210 corresponds to an acquisition process for training; the action of the storage unit for training 220 corresponds to a storage process for training; the action of the pre-processing unit for training 230 corresponds to a pre-processing process for training; the action of the training unit 240 corresponds to a training process; the action of the evaluation unit 250 corresponds to an evaluation process; and the action of the training control unit 260 corresponds to a learning control process.

First, in Step S21, the acquisition unit for training 210 acquires the training data from the storage unit for training 220.

Next, in Step S22, the pre-processing unit for training 230 selects data to be used for the training on the basis of the predetermined selection threshold.

Next, in Step S23, the training unit 240 trains the learning model using the training data selected in Step S22.

Next, in Step S24, the evaluation unit 250 evaluates the learning model trained in Step S23.

Next, in Step S25, the training control unit 260 stores the evaluation result and a parameter used to select the data at that time, namely, the selection threshold, in the storage unit for training 220. Then, the training control unit 260 resets the selection threshold to a value different from the prior selection threshold. In Embodiment 1, the method of the resetting is such that the values obtained by dividing equally the setting range of the selection threshold by the number of the search times are set in order as the selection threshold. Then, the training control unit 260 makes the search processing from Step S22 to Step S25 be repeated for each of the reset selection thresholds.

After the training control unit 260 made the search processing be executed for the predetermined number of times to complete the iterative processing, in Step S26, the evaluation unit 250 specifies, as the final selection threshold, the selection threshold with the best evaluation value from among the selection thresholds corresponding to the respective search processes.

Next, in Step S27 to Step S29, the training control unit 260 makes the selection of the training data, the training of the learning model, and the evaluation of the learning model be executed again using the selection threshold specified in Step S26.

Next, in Step S30, the training control unit 260 makes the display 410 display the evaluation result for the learning model calculated in Step S29.

Finally, in Step S31, the training unit 240 makes the storage unit for training 220 and the storage unit 20 of the failure predictor detection device 100 store the trained learning model.

As described above, the training device 200 according to Embodiment 1 selects the data obtained in the time period during which the variance value is smaller than the predetermined selection threshold as the data for training the learning model, so that the training using the regression analysis or the like can be appropriately performed and the learning model capable of estimation with high accuracy can be generated.

In addition, the training device 200 according to Embodiment 1 includes the evaluation unit which calculates the evaluation value for the learning model and the training control unit which resets the selection threshold to a value different from the prior selection threshold and makes the iterative processing in which the search processing, being a series of the processes, including the selection of the training data by the pre-processing unit, the training by the training unit, and the evaluating by the evaluation unit, is performed repeatedly be performed, and the training control unit terminates the iterative processing on the basis of the predetermined termination condition and specifies the selection threshold with the highest evaluation value in the search processing at the point of the termination of the iterative processing. Thus, the selection threshold is searched multiple times to specify the optimal selection threshold, so that the learning model can be trained more appropriately and the learning model to obtain more accurate estimations can be generated.

A modified example of the failure predictor detection device 100 and the training device 200 according to Embodiment 1 will be described below.

Figure 16:
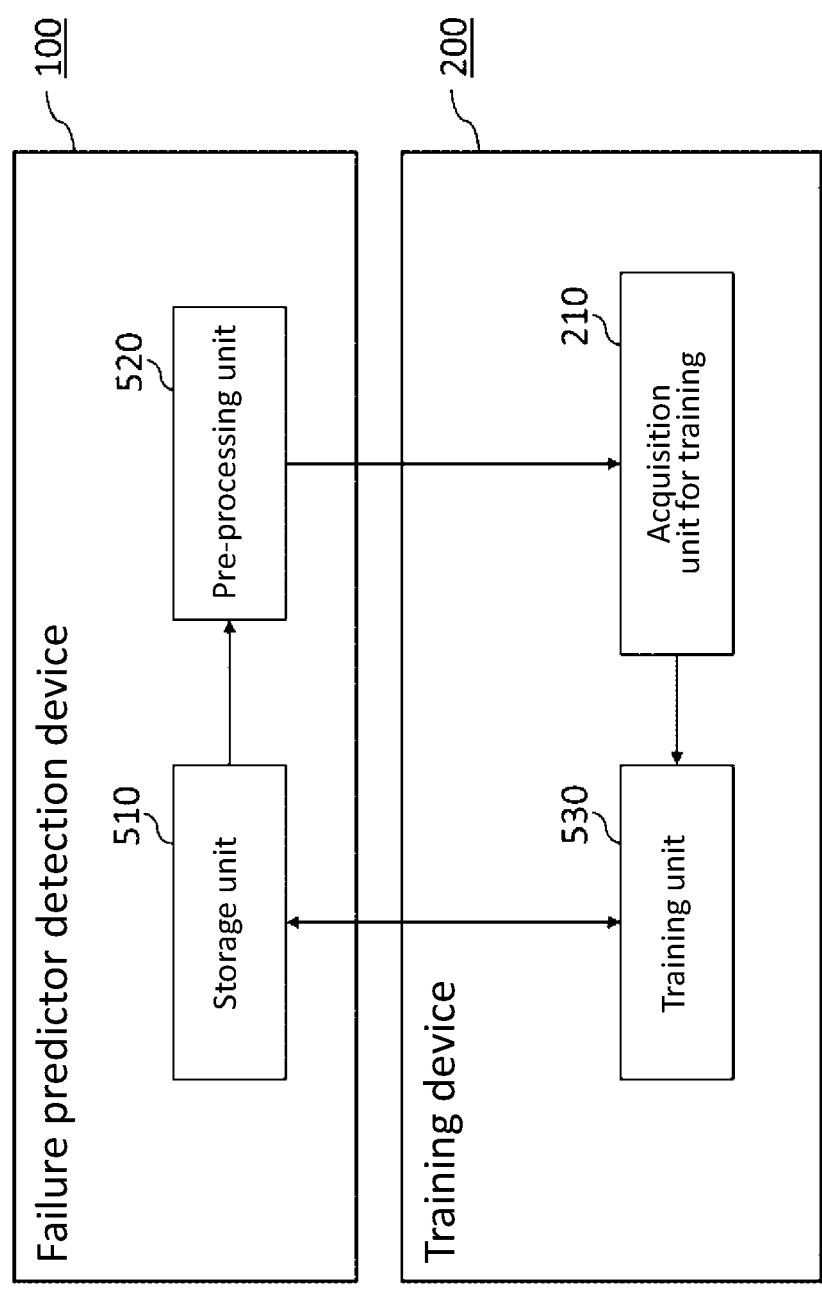
FIG. 16 is a conceptual diagram showing a modified configuration of the failure predictor detection device 100 and the training device 200 according to Embodiment 1.

Although it is described that the failure predictor detection device 100 and the training device 200 are separately equipped with the storage unit 20 (the storage unit for training 220), the pre-processing unit 30 (the pre-processing unit for training 230), and the re-training unit 70 (the training unit 240), the failure predictor detection device 100 and the training device 200 may share, as shown in FIG. 16, a storage unit 510, a pre-processing unit 520, and a training unit 530 that can be accessed from each of them. In this case, the acquisition unit for training 210 acquires the training data after the pre-processing from the pre-processing unit 520 and outputs it to the training unit 530. Instead, the failure predictor detection device 100 or the training device 200 may include the storage unit 510, the pre-processing unit 520, and the training unit 530 above.

Although it is described that the control unit 60 makes the re-training unit 70 automatically perform the re-training using, as the re-training data, the estimation data and the comparison data of the time period after the time when the long-term deviation detection unit detected the long-term environmental change, the control unit 60 may only cause the notification device 400 to make a notification prompting the re-training, instead of causing the re-training unit 70 to perform the re-training automatically. Alternatively, the re-training may be performed automatically with the notification device 400 notifying that the re-training is to be performed. This prevents the learning model from being updated without the user being aware of it.

The control unit 60 may have the display 410 display the comparison result between the estimated value and the measured value, in addition to having the notification device 400 notify of the failure predictor. This allows the user to visually check the detection result.

If the detection unit 50 can detect a level of the failure predictor from the degree of deviation, the time change thereof, or the like, the control unit 60 may cause the notification device 400 to notify of the level. This allows the user to determine whether the notified failure predictor should be addressed urgently or can be left unaddressed until the next inspection.

If the detection unit 50 can detect a failure location from the output of the learning model, the control unit 60 may cause the notification device 400 to notify of the failure location. This allows the user to appropriately recognize the location of the failure which needs to be repaired.

Although it is described that, in the long-term deviation detection unit 52, the differences between contiguous data are integrated using the degree of deviation of time series and when the integrated value exceeds the threshold value, the failure predictor is detected, the method for distinguishing between the failure predictor and the long-term environmental change is not limited to this. The trend of the data is that in the case of the failure predictor, the degree of deviation gradually increases in relation to the prediction range of the estimated value, while in the case of the long-term environmental change, the degree of deviation is approximately constant, in spite of some variance, in relation to the prediction range of the estimated value. Thus, for example, a moving average may be taken for the degree of deviation between the measured value and the estimated value arranged in chronological order, and whether it is the failure predictor or the long-term environmental change may be determined by determining whether the trend of the data is monotonically increasing or not.

Although it is described that the training control unit 260 terminates the iterative processing when the predetermined number of the searches is completed, by comparing the evaluation value and a predetermined evaluation threshold for each search processing, the iterative processing may be terminated when the evaluation value is equal to or larger than the evaluation threshold. By doing so, the iterative processing can be terminated earlier and computation time can be reduced.

Embodiment 2

Next, Embodiment 2 will be described. In Embodiment 1, an embodiment when the failure predictor detection system 1000 is applied to the air conditioning system 2000 was described. In Embodiment 2, an embodiment when the failure predictor detection system is applied to a factory automation (FA) system, that is, when the targeted equipment for the failure predictor detection is FA equipment, will be described. The configurations and the actions common to those in Embodiment 1 will be omitted from the description as appropriate. In Embodiment 2, as a concrete example of the FA system, a system will be described, in which the failure predictor detection device is connected to a power conversion device such as an inverter to detect the failure predictor of the power conversion device.

Figure 17:
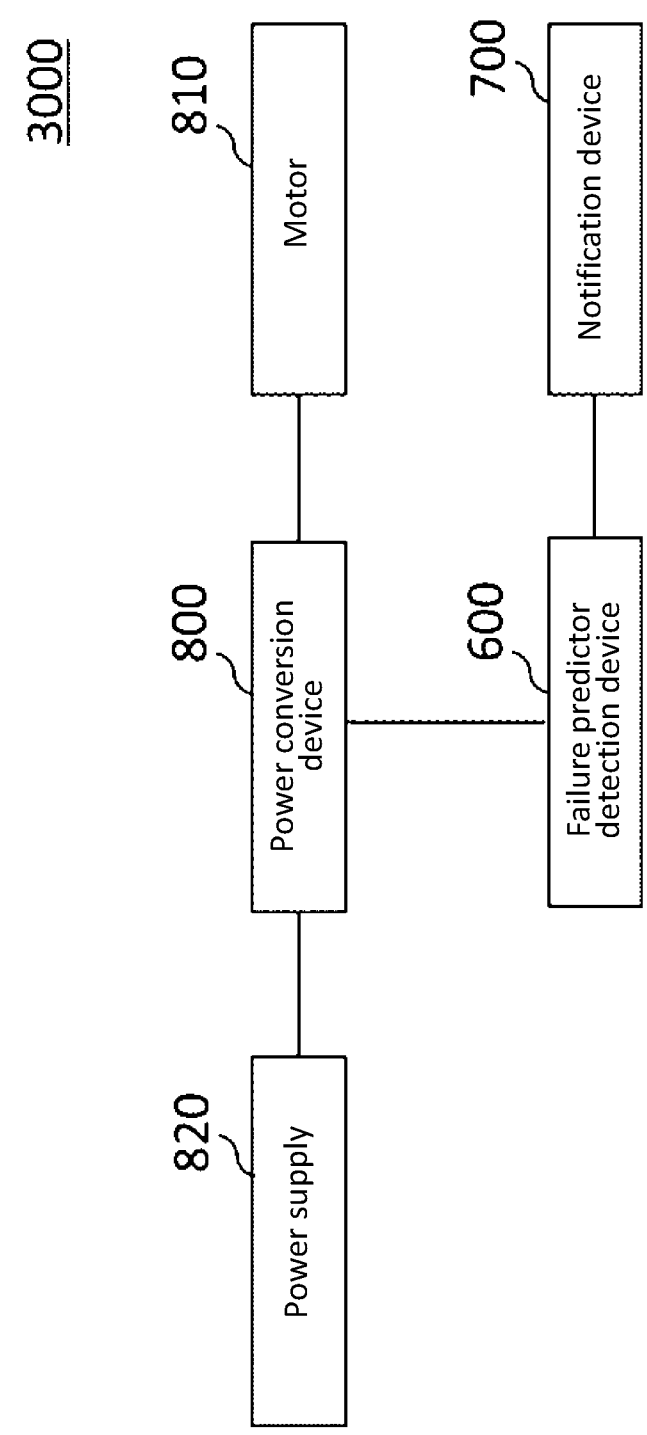
FIG. 17 is a diagram showing a configuration of an FA system 3000 according to Embodiment 2.

FIG. 17 is a diagram showing a configuration of an FA system 3000 according to Embodiment 2. The FA system 3000 includes a failure predictor detection device 600, a notification device 700, a power conversion device 800, a motor 810, and a power supply 820.

The configuration of the failure predictor detection device 600 is the same as the configuration of the failure predictor detection device 100 according to Embodiment 1, differing only in the information shown by the input/output data of the learning model. Details of the difference will be described later.

The configuration of the notification device 700 is also the same as that of the notification device 400 according to Embodiment 1 and thus will not be described here.

The power conversion device 800 converts the power inputted from the power supply 820 to power with a predetermined current, a predetermined voltage, and a predetermined frequency, and supplies the converted power to the motor 810, which is a load. The power conversion device 800 includes a power semiconductor module (hereinafter referred to as a semiconductor module) with a built-in semiconductor switching device (hereinafter referred to as a switching device) and a power conversion control unit that controls the switching device built in the semiconductor module and converts the inputted power to power with a given current, a given voltage, and a given frequency to supply the converted power to the motor 810 by controlling the switching operation of the switching device.

In addition, the power conversion device 800 includes various sensors, and sensor data obtained by the sensors is outputted to the failure predictor detection device 600.

When the power conversion device 800 is operating, the temperature of the switching device rises due to the loss in the switching device, and when the power conversion device 800 stops, the temperature of the switching device drops. The repetitive rises and drops in the temperature of the switching device, which is called a power cycle, causes deterioration of the semiconductor chip (hereinafter referred to as power cycle deterioration) on which the switching device is disposed, shortening the life of the semiconductor chip.

Although it is possible to estimate the power cycle deterioration in the power conversion device 800 if the temperature change within the semiconductor chip, i.e., the junction temperature, is known, it is difficult to directly estimate the junction temperature inside the semiconductor chip in an actual power conversion device 800. In conventional techniques, therefore, the degree of the power cycle deterioration is estimated, for example, by calculating the temperature fluctuation value from the switching frequency and the output current of the power conversion device 800.

In consideration of the above, the failure predictor detection device 600 according to Embodiment 2 compares the estimated value and the measured value of the output values in the power conversion device 800, such as the output current, the output voltage, the output frequency at multiple times and detects the failure predictor of the power conversion device 800 on the basis of the comparison results at the multiple times.

Figure 18:
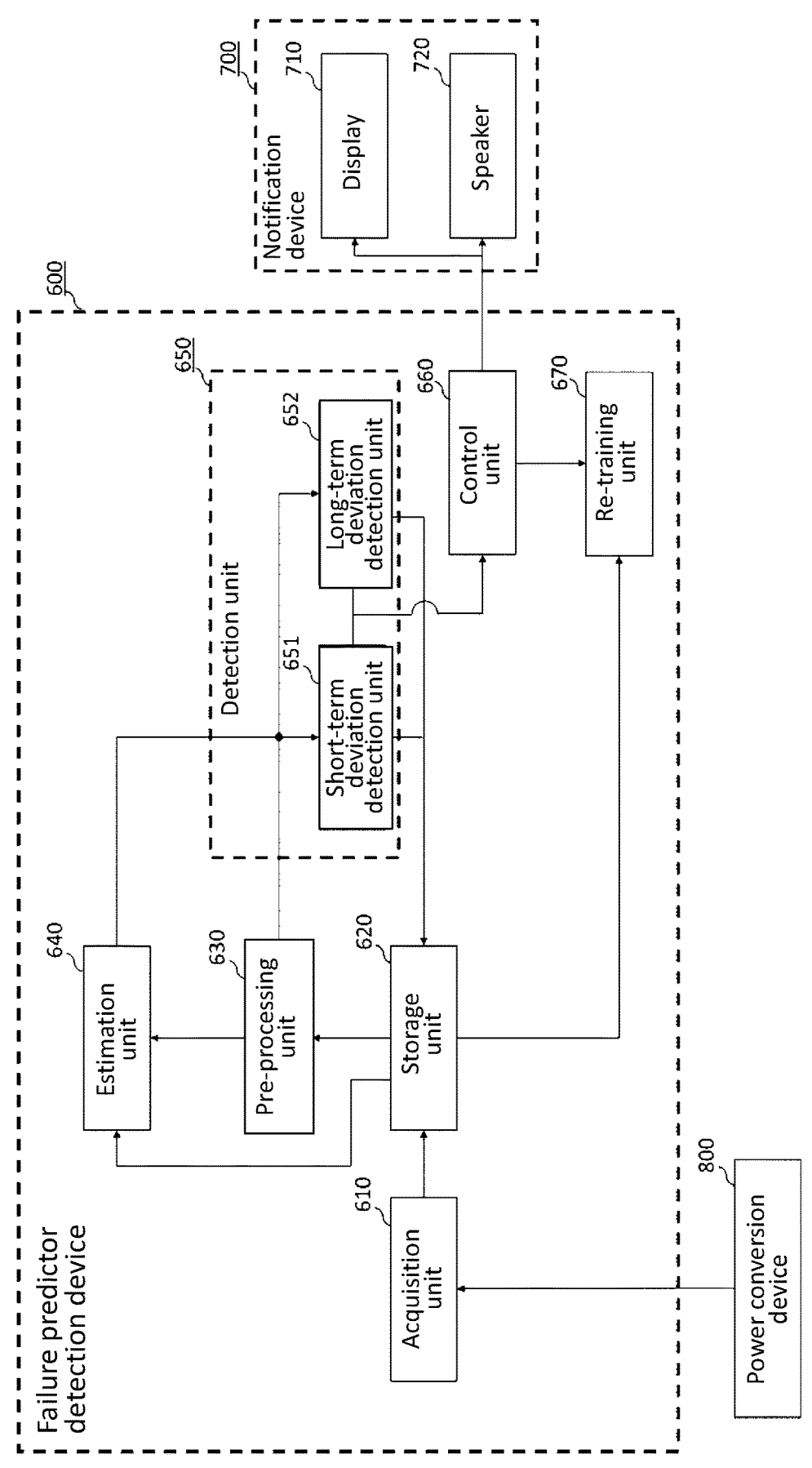
FIG. 18 is a diagram showing a configuration of a failure predictor detection device 600 according to Embodiment 2.

Details of the configuration and operation of the failure predictor detection device 600 will be described below. FIG. 18 is a diagram showing configurations of the failure predictor detection device 600 and the notification device 700 according to Embodiment 2. The failure predictor detection device 600 includes: an acquisition unit 610; a storage unit 620; a pre-processing unit 630; an estimation unit 640; a detection unit 650 having a short-term deviation detection unit 651 and a long-term deviation detection unit 652; a control unit 660; and a re-training unit 670. The notification device 700 includes a display 710 and a speaker 720. The basic configurations and actions of the units are the same as those in Embodiment 1, and only the differences will be described.

The acquisition unit 610 acquires, from the power conversion device 800, various sensor data showing an input value and an output value, etc. of the power conversion device 800 and control information showing a control command value of the power conversion control unit. The various sensor data to be acquired includes: an output current value; an output voltage value; an input voltage value; an input current value; a room temperature; and a surface temperature of the semiconductor module, etc. The control information to be acquired includes: a voltage command value; a current command value; an output frequency command value; and a switching frequency command value, etc. These are collectively called FA data. In Embodiment 2, from among the FA data included in the various sensor data, the output value of the power conversion device 800 shall be the comparison data and the other FA data of the power conversion device 800 shall be the estimation data. For example, the comparison data shows the output current value of the power conversion device 800, and the estimation data shows at least one of the other sensor values or the command values, such as: the output voltage value; the input voltage value; the input current value; the voltage command value; the current command value; the output frequency command value; the switching frequency command value; the room temperature; and the surface temperature of the semiconductor module.

The estimation unit 640 estimates, using the estimation data, the output value of the power conversion device 800, for example, the output current value of the power conversion device 800 in the example above. The detection unit 650 compares the output value of the power conversion device 800 outputted by the estimation unit 640—for example, the estimated value of the output current value of the power conversion device 800 in the example above- and the measured value shown by the comparison data at multiple times and detects the failure predictor on the basis of the comparison results. As described above, only the information shown by the estimation data and the comparison data is different between Embodiment 1 and Embodiment 2, so the specific description of the failure predictor detection will be omitted.

In this way, the failure predictor detection device 600 according to Embodiment 2 can distinguish the environmental change from the failure predictor by comparing at multiple times the estimated value and the measured value of the output value in the power conversion device 800 to detect the failure predictor of the power conversion device 800, thereby improving the detection accuracy of the failure predictor.

In Embodiment 1, it is described how the failure predictor detection system can be applied to the air conditioning system, and in Embodiment 2, it is described how the failure predictor detection system can be applied to the FA system. However, the scope of application of the failure predictor detection system is not limited to these but can be extended to other systems where it is desirable to distinguish the environmental change and the failure predictor to detect the failure predictor.

22

INDUSTRIAL AVAILABILITY

The failure predictor detection device according to the present disclosure is suitable for all the domains, such as the air conditioning system and the FA system, where some failure predictor comes up in the operation data. The basic form of its application includes: monitoring the sensor value from an internal part, etc. for which it is difficult to determine the failure predictor from the outside of the equipment; detecting the failure predictor; and notifying the failure predictor to a maintenance staff of the equipment. In its operation, by distinguishably detecting the failure predictor and the environmental change around the equipment, the false detection can be reduced, the workload of a staff can be reduced, and the re-training timing can also be detected on the basis of a quantitative indicator independent of human subjectivity.

DESCRIPTION OF SYMBOLS 1000 failure predictor detection system,
100 failure predictor detection device,
200 training device,
300 air conditioning controller,
400 notification device,
410 display,
420 speaker,
10 acquisition unit,
20 storage unit,
10 pre-processing unit,
40 estimation unit,
50 detection unit,
51 short-term deviation detection unit,
52 long-term deviation detection unit,
60 control unit,
70 re-training unit,
210 acquisition unit for training,
220 storage unit for training,
230 pre-processing unit for training,
240 training unit,
250 evaluation unit,
260 training control unit,
510 storage unit,
520 pre-processing unit,
530 training unit,
600 failure predictor detection device,
610 acquisition unit,
620 storage unit,
630 pre-processing unit,
640 estimation unit,
650 detection unit,
651 short-term deviation detection unit,
652 long-term deviation detection unit,
660 control unit,
670 re-training unit,
700 notification device,
710 display,
720 speaker,
800 power conversion device,
810 motor,
820 power supply

The invention claimed is:
1. A failure predictor detection device comprising processing circuitry:
to acquire estimation data and comparison data of targeted equipment for failure predictor detection in a targeted time period for the failure predictor detection;

to calculate an estimated value of the comparison data during a normal operation from the estimation data using a learning model;

to detect a failure predictor of the equipment based on comparison results at multiple times between the estimated values and measured values shown by the comparison data; and to select, from among the acquired estimation data and the acquired comparison data, estimation data and comparison data in a time period during which a variance value is smaller than a predetermined selection threshold and to output the selected estimation data and the selected comparison data to the processing circuitry, the variance value being a value of variance in the data in the time period, wherein the processing circuitry calculates the estimated value using the selected estimation data and detects the failure predictor of the equipment or an environmental change around the equipment based on the comparison results at multiple times between the measured values shown by the selected comparison data and the estimated values, and wherein the equipment is an air conditioner, and the processing circuitry detects the failure predictor of the air conditioner based on the estimation data and the comparison data, the comparison data being compressor frequency, the estimation data being at least one of a time of day, a power consumption, an outdoor temperature, a room temperature, a set temperature, an operating condition, a refrigerant temperature, values from various thermistors, a fan speed, and values from various pressure sensors in the air conditioner wherein the processing circuit calculates a degree of deviation between the estimated value and the measured value, and wherein the processing circuitry detects a short-term environmental change around the equipment when a time period during which the degree of deviation exceeds the predetermined threshold is shorter than a predetermined time period and detects the failure predictor of the equipment or a long-term environmental change around the equipment when a time period during which the degree of deviation exceeds a predetermined threshold is equal to or longer than the predetermined time period.

2. The failure predictor detection device according to claim 1, wherein the processing circuitry detects the failure predictor of the equipment when the degree of deviation increases over time.

3. The failure predictor detection device according to claim 2, wherein the processing circuitry detects the failure predictor of the equipment or the environmental change around the equipment when the degree of deviation exceeds the predetermined threshold at multiple times.

4. The failure predictor detection device according to claim 1, wherein the failure predictor detection device is connected to a notification device to notify a user using the failure predictor detection device of the failure predictor, and the processing circuitry further sends a control signal to cause the notification device to notify of the failure predictor when the processing circuitry detects the failure predictor.

5. The failure predictor detection device according to claim 1, wherein the processing circuitry further re-trains, when the long-term environmental change is detected, the learning model by using, as training data, the estimation data and the comparison data in a time period after a time when the long-term environmental change is detected.

6. The failure predictor detection device according to claim 1, wherein the processing circuitry calculates, using the learning model, an estimated value of the compressor frequency of the air conditioner from the estimation data, and detects the failure predictor of the air conditioner based on the calculated estimated value of the compressor frequency and a measured value of the compressor frequency shown by the comparison data.

7. The failure predictor detection device according to claim 2, wherein the processing circuitry calculates, using the learning model, an estimated value of the compressor frequency of the air conditioner from the estimation data, and detects the failure predictor of the air conditioner based on the calculated estimated value of the compressor frequency and a measured value of the compressor frequency shown by the comparison data.

8. The failure predictor detection device according to claim 3, wherein the processing circuitry calculates, using the learning model, an estimated value of the compressor frequency of the air conditioner from the estimation data, and detects the failure predictor of the air conditioner based on the calculated estimated value of the compressor frequency and a measured value of the compressor frequency shown by the comparison data.

9. The failure predictor detection device according to claim 1, wherein the equipment is factory automation (FA) equipment, and the processing circuitry detects the failure predictor of the FA equipment based on the estimation data and the comparison data obtained by a sensor provided in the FA equipment.

10. The failure predictor detection device according to claim 2, wherein the equipment is FA equipment, and the processing circuitry detects the failure predictor of the FA equipment based on the estimation data and the comparison data obtained by a sensor provided in the FA equipment.

11. The failure predictor detection device according to claim 3, wherein the equipment is FA equipment, and the processing circuitry detects the failure predictor of the FA equipment based on the estimation data and the comparison data obtained by a sensor provided in the FA equipment.

12. A failure predictor detection method comprising:

acquiring estimation data and comparison data of targeted equipment for failure predictor detection in a targeted time period for the failure predictor detection;

estimating an estimated value of the comparison data during a normal operation from the estimation data using a trained learning model;

detecting a failure predictor of the equipment based on comparison results at multiple times between the estimated values and measured values shown by the comparison data; and selecting, from among the acquired estimation data and the acquired comparison data, estimation data and comparison data in a time period during which a variance value is smaller than a predetermined selection threshold, the variance value being a value of variance in the data in the time period, wherein the estimated value is calculated using the selected estimation data, and the failure predictor of the equipment or an environmental change around the equipment is detected based on the comparison results at multiple times between the measured values shown by the selected comparison data and the estimated values, and wherein the equipment is an air conditioner, and the detecting the failure predictor of the air conditioner based on the estimation data and the comparison data, the comparison data being compressor frequency, the estimation data is at least one of a time of day, a power consumption, an outdoor temperature, a room temperature, a set temperature, an operating condition, a refrigerant temperature, values from various thermistors, a fan speed, and values from various pressure sensors in the air conditioner, wherein the processing circuit calculates a degree of deviation between the estimated value and the measured value, and wherein the processing circuitry detects a short-term environmental change around the equipment when a time period during which the degree of deviation exceeds the predetermined threshold is shorter than a predetermined time period and detects the failure predictor of the equipment or a long-term environmental change around the equipment when a time period during which the degree of deviation exceeds a predetermined threshold is equal to or longer than the predetermined time period.

\* \* \* \* \*